US012782538B2

(12) United States Patent
Kawasaki

(10) Patent No.: US 12,782,538 B2
(45) Date of Patent: Nov. 3, 2026

(54) INFORMATION PROCESSING APPARATUS, INFORMATION PROCESSING METHOD, AND INFORMATION PROCESSING SYSTEM

(71) Applicant: SONY GROUP CORPORATION, Tokyo (JP)

(72) Inventor: Kenichi Kawasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 240 days.

(21) Appl. No.: 18/703,468

(22) PCT Filed: Oct. 14, 2022

(86) PCT No.: PCT/JP2022/038438
§ 371 (c)(1),
(2) Date: Apr. 22, 2024

(87) PCT Pub. No.: WO2023/074419
PCT Pub. Date: May 4, 2023

(65) Prior Publication Data
US 2024/0426997 A1 Dec. 26, 2024

(30) Foreign Application Priority Data
Oct. 29, 2021 (JP) ................................ 2021-177169

(51) Int. Cl.
*G01S 13/06* (2006.01)
*G01S 7/41* (2006.01)
(Continued)

(52) U.S. Cl.
CPC ............... *G01S 13/06* (2013.01); *G01S 7/411* (2013.01); *G01S 13/931* (2013.01); *H04W 4/029* (2018.02); *H04W 4/44* (2018.02)

(58) Field of Classification Search
CPC ........ G01S 13/06; G01S 7/411; G01S 13/931; G01S 13/876; G01S 2013/9316;
(Continued)

(56) References Cited

U.S. PATENT DOCUMENTS 5,548,296 A * 8/1996 Matsuno .............. H04W 64/00 342/418
5,859,612 A * 1/1999 Gilhousen ........... H04B 7/2628 342/449
(Continued)

FOREIGN PATENT DOCUMENTS

JP 10-300493 A 11/1998
JP 2000-348297 A 12/2000
(Continued)

OTHER PUBLICATIONS

International Search Report and Written Opinion of PCT Application No. PCT/JP2022/038438, issued on Dec. 20, 2022, 09 pages of ISRWO.

*Primary Examiner* — Bernarr E Gregory
(74) *Attorney, Agent, or Firm* — CHIP LAW GROUP

(57) ABSTRACT

The present technology relates to an information processing apparatus, an information processing method, and an information processing system that are configured to improve accuracy of self-position estimation of a vehicle. The information processing apparatus includes: a communication unit that performs communication with a base station of wireless communication that transmits information used for self-position estimation of a vehicle; and a self-position estimation unit that performs self-position estimation of the vehicle on the basis of a reflecting body map indicating a distribution of reflecting bodies in a case where the communication with the base station is not possible. The present technology
(Continued)

can be applied to, for example, a self-position estimation device that executes self-position estimation of a vehicle.

16 Claims, 14 Drawing Sheets

(51) Int. Cl.
*G01S 13/931* (2020.01)
*H04W 4/029* (2018.01)
*H04W 4/44* (2018.01)

(58) Field of Classification Search
CPC .......... G01S 2013/9329; G01S 5/0244; H04W 4/029; H04W 4/44; H04W 64/00; G01C 21/28; G08G 1/13; G08G 1/0104; H04B 7/2626
See application file for complete search history.

(56) References Cited

U.S. PATENT DOCUMENTS

| | | | | |
|---|---|---|---|---|
| 5,970,413 | A * | 10/1999 | Gilhousen ............ | H04B 7/2628<br>455/457 |
| 6,034,635 | A * | 3/2000 | Gilhousen ............. | H04W 64/00<br>342/457 |
| 2001/0018344 | A1 * | 8/2001 | Tervo ................... | G08G 1/0104<br>455/435.1 |
| 2005/0192026 | A1 * | 9/2005 | Carlson ................. | H04W 4/029<br>370/335 |
| 2011/0090122 | A1 * | 4/2011 | Thomson .............. | G01S 5/0244<br>342/450 |

FOREIGN PATENT DOCUMENTS

| | | |
|---|---|---|
| JP | 2017-036980 A | 2/2017 |
| JP | 2021-099275 A | 7/2021 |

* cited by examiner

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2022/038438 filed on Oct. 14, 2022, which claims priority benefit of Japanese Patent Application No. JP 2021-177169 filed in the Japan Patent Office on Oct. 29, 2021. Each of the above-referenced applications is hereby incorporated herein by reference in its entirety.

TECHNICAL FIELD

The present technology relates to an information processing apparatus, an information processing method, and an information processing system, and particularly relates to an information processing apparatus, an information processing method, and an information processing system that are configured to improve accuracy of self-position estimation of a vehicle.

BACKGROUND ART

In recent years, various methods have been proposed in order to improve the accuracy of self-position estimation of a vehicle (see, for example, Patent Document 1).

For example, there is a method of improving the accuracy of self-position estimation by using information received from a base station of a fifth generation mobile communication system (5G) (hereinafter, referred to as 5G information) in addition to information acquired from a global navigation satellite system (GNSS) satellite (hereinafter, referred to as GNSS information).

CITATION LIST

Patent Document

Patent Document 1: Japanese Patent Application Laid-Open No. 2021-99275

SUMMARY OF THE INVENTION

Problems to be Solved by the Invention

However, in a case where the self-position estimation is performed on the basis of the GNSS information and the 5G information, in a case where radio waves cannot be received from at least one of the GNSS satellite and the 5G base station, the accuracy of the self-position estimation is greatly reduced.

In response to this, in a case where the radio wave cannot be received from at least one of the GNSS satellite and the 5G base station, for example, an amount of change in the position of the vehicle is detected and integrated on the basis of an acceleration and an angular velocity detected by an inertial measurement unit (IMU) provided in the vehicle to enable the self-position estimation. However, in this case, an estimation error based on a detection error of the IMU is accumulated to cause the accuracy of the self-position estimation to decrease.

The present technology has been made in view of such circumstances, and it is an object of the present technology to improve the accuracy of the self-position estimation of a vehicle.

Solutions to Problems

An information processing apparatus according to a first aspect of the present technology includes: a communication unit that performs communication with a base station of wireless communication that transmits information used for self-position estimation of a vehicle; and a self-position estimation unit that performs self-position estimation of the vehicle on the basis of a reflecting body map indicating a distribution of reflecting bodies in a case where the communication with the base station is not possible.

An information processing method according to the first aspect of the present technology includes: performing communication with a base station of wireless communication that transmits information used for self-position estimation of a vehicle; and performing self-position estimation of the vehicle on the basis of a reflecting body map indicating a distribution of reflecting bodies in a case where the communication with the base station is not possible.

In the first aspect of the present technology, the communication is performed with the base station of wireless communication that transmits information used for the self-position estimation of the vehicle; and the self-position estimation of the vehicle is performed on the basis of the reflecting body map indicating a distribution of the reflecting bodies in a case where the communication with the base station is not possible.

An information processing system according to a second aspect of the present technology includes: a base station of wireless communication that transmits information used for self-position estimation of a vehicle; and an information processing apparatus that performs self-position estimation of the vehicle, in which the information processing apparatus includes: a communication unit that performs communication with the base station; and a self-position estimation unit that performs self-position estimation of the vehicle on the basis of a reflecting body map indicating a distribution of reflecting bodies in a case where the communication with the base station is not possible.

In the second aspect of the present technology, the information used for the self-position estimation of the vehicle is transmitted by the base station, the information processing apparatus performs the communication with the base station, and in a case where the communication with the base station is not possible, the self-position estimation of the vehicle is performed on the basis of the reflecting body map indicating a distribution of the reflecting bodies.

MODE FOR CARRYING OUT THE INVENTION

Hereinafter, a mode for carrying out the present technology will be described. The description is given in the following order.

1. Configuration example of vehicle control system
2. First Embodiment
3. Second Embodiment
4. Modifications
5. Others

1. Configuration Example of Vehicle Control System

Figure 1:
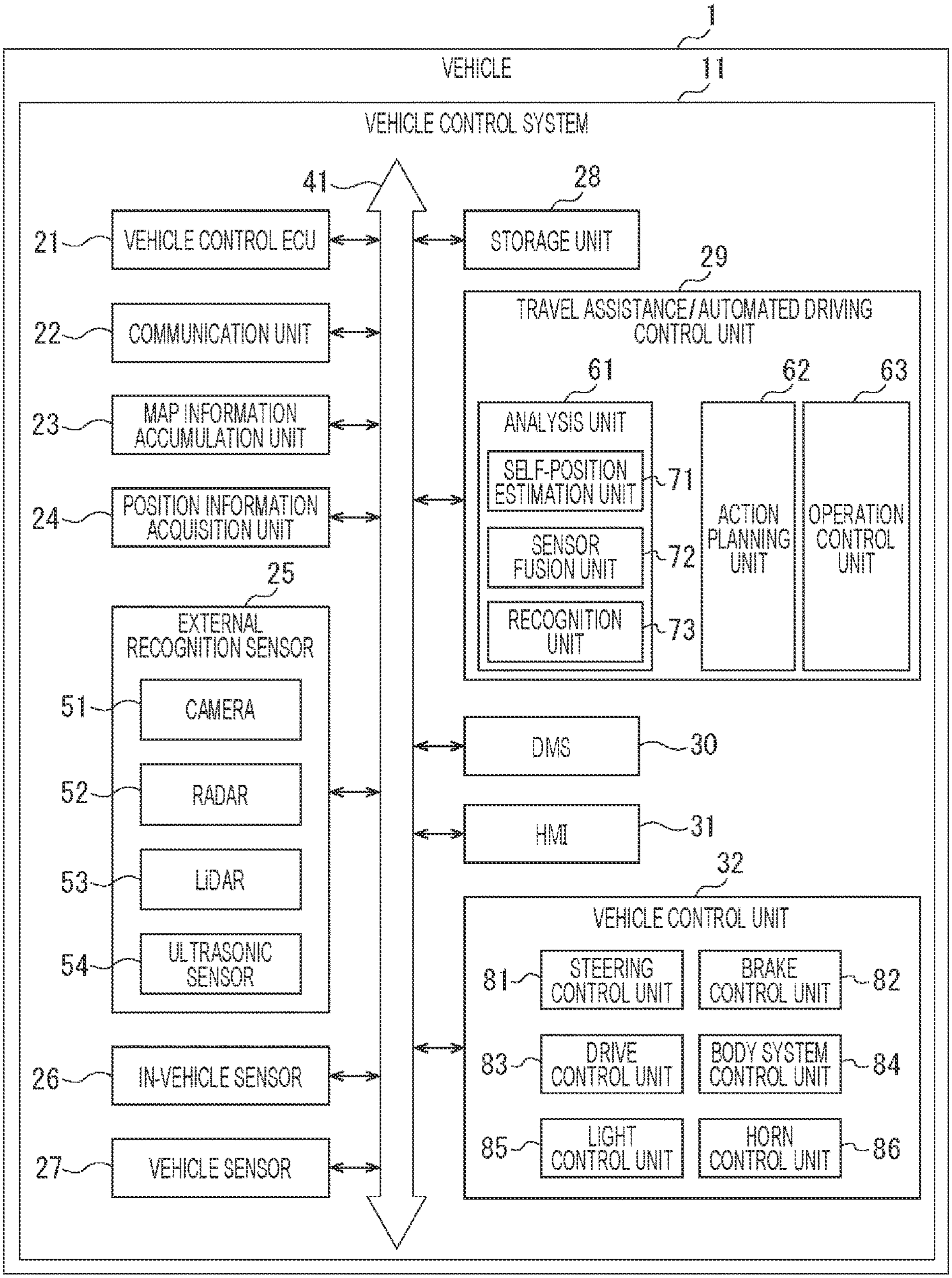
FIG. 1 is a block diagram illustrating a configuration example of a vehicle control system.

FIG. 1 is a block diagram illustrating a configuration example of a vehicle control system 11, which is an example of a mobile device control system to which the present technology is applied.

The vehicle control system 11 is provided in a vehicle 1 and performs processing related to travel assistance and automated driving of the vehicle 1.

The vehicle control system 11 includes a vehicle control electronic control unit (ECU) 21, a communication unit 22, a map information accumulation unit 23, a position information acquisition unit 24, an external recognition sensor 25, an in-vehicle sensor 26, a vehicle sensor 27, a storage unit 28, a travel assistance/automated driving control unit 29, a driver monitoring system (DMS) 30, a human machine interface (HMI) 31, and a vehicle control unit 32.

The vehicle control ECU 21, the communication unit 22, the map information accumulation unit 23, the position information acquisition unit 24, the external recognition sensor 25, the in-vehicle sensor 26, the vehicle sensor 27, the storage unit 28, the travel assistance/automated driving control unit 29, the driver monitoring system (DMS) 30, the human machine interface (HMI) 31, and the vehicle control unit 32 are communicably connected to each other via a communication network 41. The communication network 41 includes, for example, an in-vehicle communication network, a bus, and the like that conform to a digital bidirectional communication standard such as a controller area network (CAN), a local interconnect network (LIN), a local area network (LAN), FlexRay®, or Ethernet®. The communication network 41 may be selectively used depending on the type of data to be transmitted. For example, the CAN may be applied to data related to vehicle control, and the Ethernet® may be applied to large-volume data. Note that, in some cases, each unit of the vehicle control system 11 is directly connected not via the communication network 41 but by, for example, wireless communication that assumes communication at a relatively short distance, such as near field communication (NFC) or Bluetooth®.

Note that, hereinafter, in a case where each unit of the vehicle control system 11 performs communication via the communication network 41, description of the communication network 41 will be omitted. For example, in a case where the vehicle control ECU 21 and the communication unit 22 perform communication via the communication network 41, it is simply described that the vehicle control ECU 21 and the communication unit 22 perform communication.

For example, the vehicle control ECU 21 includes various processors such as a central processing unit (CPU) and a micro processing unit (MPU). The vehicle control ECU 21 controls all or some of the functions of the vehicle control system 11.

The communication unit 22 communicates with various devices inside and outside the vehicle, other vehicles, servers, base stations, and the like, and transmits and receives various types of data. At this time, the communication unit 22 can perform communication by using a plurality of communication systems.

Communication with the outside of the vehicle executable by the communication unit 22 will be schematically described. The communication unit 22 communicates with a server (hereinafter, referred to as an external server) or the like present on an external network via a base station or an access point by, for example, a wireless communication system such as fifth generation mobile communication system (5G), long term evolution (LTE), dedicated short range communications (DSRC), or the like. Examples of the external network with which the communication unit 22 performs communication include the Internet, a cloud network, a company-specific network, and the like. A communication system by which the communication unit 22 communicates with the external network is not particularly limited as long as it is a wireless communication system that can perform digital bidirectional communication at a predetermined communication speed or higher and at a predetermined distance or longer.

Furthermore, for example, the communication unit 22 can communicate with a terminal present in the vicinity of a host vehicle using a peer to peer (P2P) technology. The terminal present in the vicinity of the host vehicle is, for example, a terminal attached to a moving body moving at a relatively low speed such as a pedestrian or a bicycle, a terminal fixedly installed in a store or the like, or a machine type communication (MTC) terminal. Moreover, the communication unit 22 can also perform V2X communication. The V2X communication refers to, for example, communication between the host vehicle and another vehicle, such as vehicle to vehicle communication with another vehicle, vehicle to infrastructure communication with a roadside device or the like, vehicle to home communication, and vehicle to pedestrian communication with a terminal or the like carried by a pedestrian.

For example, the communication unit 22 can receive a program for updating software for controlling the operation of the vehicle control system 11 from the outside (Over The Air). The communication unit 22 can further receive map information, traffic information, information around the vehicle 1, and the like from the outside. Furthermore, for example, the communication unit 22 can transmit information regarding the vehicle 1, information around the vehicle 1, and the like to the outside. Examples of the information regarding the vehicle 1 transmitted to the outside by the communication unit 22 include data indicating a state of the vehicle 1, a recognition result from a recognition unit 73, and the like. Moreover, for example, the communication unit 22 performs communication corresponding to a vehicle emergency call system such as eCall®.

For example, the communication unit 22 receives an electromagnetic wave transmitted by Vehicle Information and Communication System VICS®), such as a radio wave beacon, an optical beacon, or FM multiplex broadcasting.

Communication with the inside of the vehicle executable by the communication unit 22 will be schematically described. The communication unit 22 can communicate with each device in the vehicle, by using, for example, wireless communication. The communication unit 22 can perform wireless communication with a device in the vehicle by, for example, a communication system allowing digital bidirectional communication at a predetermined communication speed or higher by wireless communication, such as wireless LAN, Bluetooth® NFC, or wireless USB (WUSB). In addition thereto, the communication unit 22 can also communicate with each device in the vehicle by using wired communication. For example, the communication unit 22 can communicate with each device in the vehicle by wired communication via a cable connected to a not-illustrated connection terminal. The communication unit 22 can communicate with each device in the vehicle by a communication system by which digital bidirectional communication can be performed at a predetermined communication speed or higher by wired communication, such as universal serial bus (USB), High-Definition Multimedia Interface HDMI®), or mobile high-definition link (MHL).

Here, the device in the vehicle refers to, for example, a device that is not connected to the communication network 41 in the vehicle. As the device in the vehicle, for example, a mobile device or a wearable device carried by an occupant such as a driver or the like, an information device brought into the vehicle and temporarily installed, or the like is assumed.

The map information accumulation unit 23 accumulates one or both of a map acquired from the outside and a map created by the vehicle 1. For example, the map information accumulation unit 23 accumulates a three-dimensional high-precision map, a global map having lower accuracy than the high-precision map and covering a wide area, and the like.

The high-precision map is, for example, a dynamic map, a point cloud map, a vector map, or the like. The dynamic map is, for example, a map including four layers of dynamic information, semi-dynamic information, semi-static information, and static information, and is provided to the vehicle 1 from an external server or the like. The point cloud map is a map including a point cloud (point cloud data). The vector map is, for example, a map in which traffic information such as a lane and a traffic light position is associated with a point cloud map and adapted to an advanced driver assistance system (ADAS) or autonomous driving (AD).

The point cloud map and the vector map may be provided from, for example, an external server or the like, or may be created by the vehicle 1 as a map for performing matching with a local map to be described later on the basis of a sensing result by a camera 51, a radar 52, a LiDAR 53, or the like, and may be accumulated in the map information accumulation unit 23. Furthermore, in a case where a high-precision map is provided from an external server or the like, for example, map data of several hundred meters square regarding a planned path on which the vehicle 1 is about to travel is acquired from the external server or the like in order to reduce the communication capacity.

The position information acquisition unit 24 receives a global navigation satellite system (GNSS) signal from a GNSS satellite, and acquires position information of the vehicle 1. The acquired position information is supplied to the travel assistance/automated driving control unit 29. Note that the position information acquisition unit 24 may acquire the position information using not only a system using the GNSS signal, but also, for example, a beacon.

The external recognition sensor 25 includes various sensors used for recognizing the situation outside the vehicle 1, and supplies sensor data from each sensor to each unit of the vehicle control system 11. Any type and number of sensors included in the external recognition sensor 25 may be adopted.

For example, the external recognition sensor 25 includes the camera 51, the radar 52, a light detection and ranging or laser imaging detection and ranging (LiDAR) 53, and an ultrasonic sensor 54. In addition thereto, the external recognition sensor 25 may include one or more types of sensors among the camera 51, the radar 52, the LiDAR 53, and the ultrasonic sensor 54. The number of the cameras 51, the radars 52, the LiDARs 53, and the ultrasonic sensors 54 is not particularly limited as long as the number of the sensors can be practically installed in the vehicle 1. Furthermore, the types of sensors included in the external recognition sensor 25 are not limited to this example, and the external recognition sensor 25 may include a sensor of another type. An example of the sensing area of each sensor included in the external recognition sensor 25 will be described later.

Note that an imaging method of the camera 51 is not particularly limited. For example, cameras of various imaging methods such as a time of flight (ToF) camera, a stereo camera, a monocular camera, and an infrared camera, which are imaging methods that can perform distance measurement, can be applied to the camera 51 as necessary. In addition thereto, the camera 51 may be the one that simply acquires a captured image without regard to distance measurement.

Furthermore, for example, the external recognition sensor 25 can include an environment sensor for detecting the environment around the vehicle 1. The environment sensor is a sensor for detecting the environment such as weather, climate, and brightness, and can include, for example, various sensors such as a raindrop sensor, a fog sensor, a sunshine sensor, a snow sensor, and an illuminance sensor.

Moreover, for example, the external recognition sensor 25 includes a microphone used for detecting sound around the vehicle 1, a position of a sound source, and the like.

The in-vehicle sensor 26 includes various sensors for detecting information inside the vehicle, and supplies sensor data from each sensor to each unit of the vehicle control system 11. The type and the number of various sensors included in the in-vehicle sensor 26 are not particularly limited as long as the type and the number of the sensors can be practically installed in the vehicle 1.

For example, the in-vehicle sensor 26 can include one or more sensors among a camera, a radar, a seating sensor, a steering wheel sensor, a microphone, and a biological sensor. As the camera included in the in-vehicle sensor 26, for example, cameras of various imaging methods that can measure a distance, such as a ToF camera, a stereo camera, a monocular camera, and an infrared camera, can be used. In addition thereto, the camera included in the in-vehicle sensor 26 may be the one that simply acquires a captured image without regard to distance measurement. The biological sensor included in the in-vehicle sensor 26 is provided, for example, on a seat, a steering wheel, or the like, and detects various types of biological information of an occupant such as a driver.

The vehicle sensor 27 includes various sensors for detecting the state of the vehicle 1, and supplies sensor data from each sensor to each unit of the vehicle control system 11. The type and the number of various sensors included in the vehicle sensor 27 are not particularly limited as long as the types and numbers of the sensors can be practically installed in the vehicle 1.

For example, the vehicle sensor 27 includes a speed sensor, an acceleration sensor, an angular velocity sensor (gyro sensor), and an inertial measurement unit (IMU) integrating these sensors. For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the number of rotations of an engine or a motor, an air pressure sensor that detects the air pressure of a tire, a slip ratio sensor that detects the slip ratio of the tire, and a wheel speed sensor that detects the rotation speed of a wheel. For example, the vehicle sensor 27 includes a battery sensor that detects a remaining amount and a temperature of a battery, and an impact sensor that detects an external impact.

The storage unit 28 includes at least one of a nonvolatile storage medium or a volatile storage medium, and stores data and a program. The storage unit 28 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be applied as a storage medium. The storage unit 28 stores various types of programs and data used by each unit of the vehicle control system 11. For example, the storage unit 28 includes an event data recorder (EDR) and a data storage system for automated driving (DSSAD) and stores information of the vehicle 1 before and after an event such as an accident and information acquired by the in-vehicle sensor 26.

The travel assistance/automated driving control unit 29 controls travel assistance and automated driving of the vehicle 1. For example, the travel assistance/automated driving control unit 29 includes an analysis unit 61, an action planning unit 62, and an operation control unit 63.

The analysis unit 61 analyzes the vehicle 1 and the situation around the vehicle. The analysis unit 61 includes a self-position estimation unit 71, a sensor fusion unit 72, and the recognition unit 73.

The self-position estimation unit 71 estimates a self-position of the vehicle 1 on the basis of sensor data from the external recognition sensor 25 and a high-precision map accumulated in the map information accumulation unit 23. For example, the self-position estimation unit 71 generates a local map on the basis of sensor data from the external recognition sensor 25 and estimates the self-position of the vehicle 1 by matching the local map with the high-precision map. The position of the vehicle 1 is based on, for example, the center of a rear wheel pair axle.

The local map is, for example, a three-dimensional high-precision map created using a technology such as simultaneous localization and mapping (SLAM), or the like, an occupancy grid map, or the like. The three-dimensional high-precision map is, for example, the above-described point cloud map or the like. The occupancy grid map is a map in which a three-dimensional or two-dimensional space around the vehicle 1 is divided into grids (lattices) of a predetermined size, and an occupancy state of an object is indicated in units of grids. The occupancy state of the object is indicated by, for example, the presence or absence or existence probability of the object. The local map is also used for, for example, detection processing and recognition processing of the situation outside the vehicle 1 by the recognition unit 73.

Note that the self-position estimation unit 71 may estimate the self-position of the vehicle 1 on the basis of the position information acquired by the position information acquisition unit 24 and the sensor data from the vehicle sensor 27.

The sensor fusion unit 72 performs sensor fusion processing to obtain new information by combining a plurality of different types of sensor data (for example, image data supplied from the camera 51 and sensor data supplied from the radar 52). Methods of combining different types of sensor data include integration, fusion, association, and the like.

The recognition unit 73 executes detection processing for detecting the situation outside the vehicle 1 and recognition processing for recognizing the situation outside the vehicle 1.

For example, the recognition unit 73 performs the detection processing and the recognition processing of the situation outside the vehicle 1 on the basis of information from the external recognition sensor 25, information from the self-position estimation unit 71, information from the sensor fusion unit 72, and the like.

Specifically, for example, the recognition unit 73 performs the detection processing, the recognition processing, and the like of an object around the vehicle 1. The detection processing of an object is, for example, processing of detecting the presence or absence, size, shape, position, motion, and the like of the object. The recognition processing of an object is, for example, processing of recognizing an attribute such as a type of the object or identifying a specific object. However, the detection processing and the recognition processing are not always clearly separated from each other and overlap each other in some cases.

For example, the recognition unit 73 detects an object around the vehicle 1 by performing clustering to classify point clouds based on sensor data by the radar 52, the LiDAR 53, or the like into clusters of point clouds. With this arrangement, the presence or absence, size, shape, and position of the object around the vehicle 1 are detected.

For example, the recognition unit 73 detects a motion of the object around the vehicle 1 by performing tracking that follows a motion of the cluster of point clouds classified by the clustering. With this arrangement, the speed and the traveling direction (movement vector) of the object around the vehicle 1 are detected.

For example, the recognition unit 73 detects or recognizes a vehicle, a person, a bicycle, an obstacle, a structure, a road, a traffic light, a traffic sign, a road sign, and the like on the basis of the image data supplied from the camera 51. Furthermore, the recognition unit 73 may recognize the type of the object around the vehicle 1 by performing recognition processing such as semantic segmentation.

For example, the recognition unit 73 can perform recognition processing of traffic rules around the vehicle 1 on the basis of a map accumulated in the map information accumulation unit 23, an estimation result of the self-position by the self-position estimation unit 71, and a recognition result of an object around the vehicle 1 by the recognition unit 73. Through this processing, the recognition unit 73 can recognize the position and the state of the traffic light, the contents of the traffic sign and the road sign, the contents of the traffic regulation, the travelable lane, and the like.

For example, the recognition unit 73 can perform recognition processing of the environment around the vehicle 1. As the environment around to be recognized by the recognition unit 73, weather, temperature, humidity, brightness, road surface conditions, and the like are assumed.

The action planning unit 62 creates an action plan for the vehicle 1. For example, the action planning unit 62 creates an action plan by performing path planning and path following processing.

Note that the path planning (global path planning) is processing of planning a rough path from a start to a goal. This path planning also includes processing called a trajectory plan in which local path planning is performed, the local path planning enabling safe and smooth traveling in the vicinity of the vehicle 1 in consideration of the motion characteristics of the vehicle 1 in the planned path.

The path following is processing of planning an operation for safely and accurately traveling a path planned by the path planning within a planned time. For example, the action planning unit 62 can calculate the target speed and the target angular velocity of the vehicle 1 on the basis of a result of the path following processing.

The operation control unit 63 controls operation of the vehicle 1 in order to achieve the action plan created by the action planning unit 62.

For example, the operation control unit 63 controls a steering control unit 81, a brake control unit 82, and a drive control unit 83 included in the vehicle control unit 32 described later, and performs acceleration and deceleration control and direction control so that the vehicle 1 travels on the trajectory calculated by the trajectory planning. For example, the operation control unit 63 performs coordinated control for the purpose of implementing the functions of the ADAS such as collision avoidance or impact mitigation, follow-up traveling, vehicle-speed maintaining traveling, warning of collision of the host vehicle, warning of lane departure of the host vehicle, and the like. For example, the operation control unit 63 performs cooperative control for the purpose of automated driving or the like in which the vehicle autonomously travels without depending on the operation of the driver.

The DMS 30 performs authentication processing of a driver, recognition processing of a state of the driver, and the like on the basis of sensor data from the in-vehicle sensor 26, input data input to the HMI 31 described later, and the like. As the state of the driver to be recognized, for example, a physical condition, an alertness level, a concentration level, a fatigue level, a line-of-sight direction, a drunkenness level, a driving operation, a posture, and the like are assumed.

Note that the DMS 30 may perform authentication processing for an occupant other than the driver and recognition processing for the state of the occupant. Furthermore, for example, the DMS 30 may execute recognition processing on the conditions inside the vehicle on the basis of sensor data from the in-vehicle sensor 26. As the condition inside the vehicle to be a recognition target, for example, temperature, humidity, brightness, odor, and the like are assumed.

The HMI 31 inputs various types of data, instructions, and the like, and presents various types of data to the driver and the like.

The input of data through the HMI 31 will be schematically described. The HMI 31 includes an input device for a person to input data. The HMI 31 generates an input signal on the basis of data, an instruction, or the like input with the input device, and supplies the input signal to each unit of the vehicle control system 11. The HMI 31 includes, for example, an operation element such as a touch panel, a button, a switch, and a lever as the input device. In addition thereto, the HMI 31 may further include an input device that can input information by a method such as voice, gesture, or the like other than manual operation. Moreover, the HMI 31 may use, for example, a remote control device using infrared rays or radio waves, or an external connection device such as a mobile device or a wearable device adapted to the operation of the vehicle control system 11, as an input device.

Presentation of data by the HMI 31 will be schematically described. The HMI 31 generates visual information, auditory information, and haptic information regarding an occupant or the outside of a vehicle. Furthermore, the HMI 31 performs output control to control outputting, output contents, an output timing, an output method, and the like of each piece of generated information. The HMI 31 generates and outputs as the visual information, for example, information indicated by images or light, such as an operation screen, a display of the state of the vehicle 1, a warning display, and a monitor image indicating a situation around the vehicle 1. Furthermore, the HMI 31 generates and outputs, as the auditory information, for example, information indicated by sounds, such as voice guidance, a warning sound, and a warning message. Moreover, the HMI 31 generates and outputs, as the haptic information, for example, information given to the sense of touch of the passenger by, for example, force, vibration, motion, or the like.

As an output device that the HMI 31 outputs visual information, for example, a display device that presents visual information by displaying an image by itself or a projector device that presents visual information by projecting an image can be applied. Note that the display apparatus may be, for example, an apparatus that displays the visual information in the field of view of an occupant, such as a head-up display, a transmissive display, or a wearable device having an augmented reality (AR) function, as well as a display device having an ordinary display. Furthermore, in the HMI 31, a display device included in a navigation device, an instrument panel, a camera monitoring system (CMS), an electronic mirror, a lamp, or the like provided in the vehicle 1 can also be used as an output device that outputs visual information.

As the output device from which the HMI 31 outputs the auditory information, for example, an audio speaker, a headphone, or an earphone can be applied.

As an output device to which the HMI 31 outputs the haptic information, for example, a haptic element using a haptic technology can be applied. The haptic element is provided, for example, at a portion with which a passenger of the vehicle 1 comes into contact, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, and the like of a state of a steering system of the vehicle 1. The steering system includes, for example, a steering mechanism including a steering wheel and the like, an electric power steering, and the like. The steering control unit 81 includes, for example, a steering ECU that controls the steering system, an actuator that drives the steering system, and the like.

The brake control unit 82 performs detection, control, and the like of a state of a brake system of the vehicle 1. The brake system includes, for example, a brake mechanism including a brake pedal and the like, an antilock brake system (ABS), a regenerative brake mechanism, and the like. The brake control unit 82 includes, for example, a brake ECU that controls the brake system, an actuator that drives the brake system, and the like.

The drive control unit 83 performs detection, control, and the like of a state of a drive system of the vehicle 1. The drive system includes, for example, an accelerator pedal, a driving force generation device for generating a driving force, such as an internal combustion engine or a driving motor, a driving force transmission mechanism for transmitting the driving force to wheels, and the like. The drive control unit 83 includes, for example, a drive ECU that controls the drive system, an actuator that drives the drive system, and the like.

The body system control unit 84 performs detection and control of a state of a body system of the vehicle 1, and the like. The body system includes, for example, a keyless entry system, a smart key system, a power window device, a power seat, an air conditioner, an airbag, a seat belt, a shift lever, and the like. The body system control unit 84 includes, for example, a body system ECU that controls the body system, an actuator that drives the body system, and the like.

The light control unit 85 performs detection and control of states of various lights of the vehicle 1, and the like. As the lights to be controlled, for example, a headlight, a backlight, a fog light, a turn signal, a brake light, a projection, a bumper display, and the like are assumed. The light control unit 85 includes a light ECU that controls the lights, an actuator that drives the lights, and the like.

The horn control unit 86 performs detection and control of a state of a car horn of the vehicle 1, and the like. The horn control unit 86 includes, for example, a horn ECU that controls the car horn, an actuator that drives the car horn, and the like.

Figure 2:
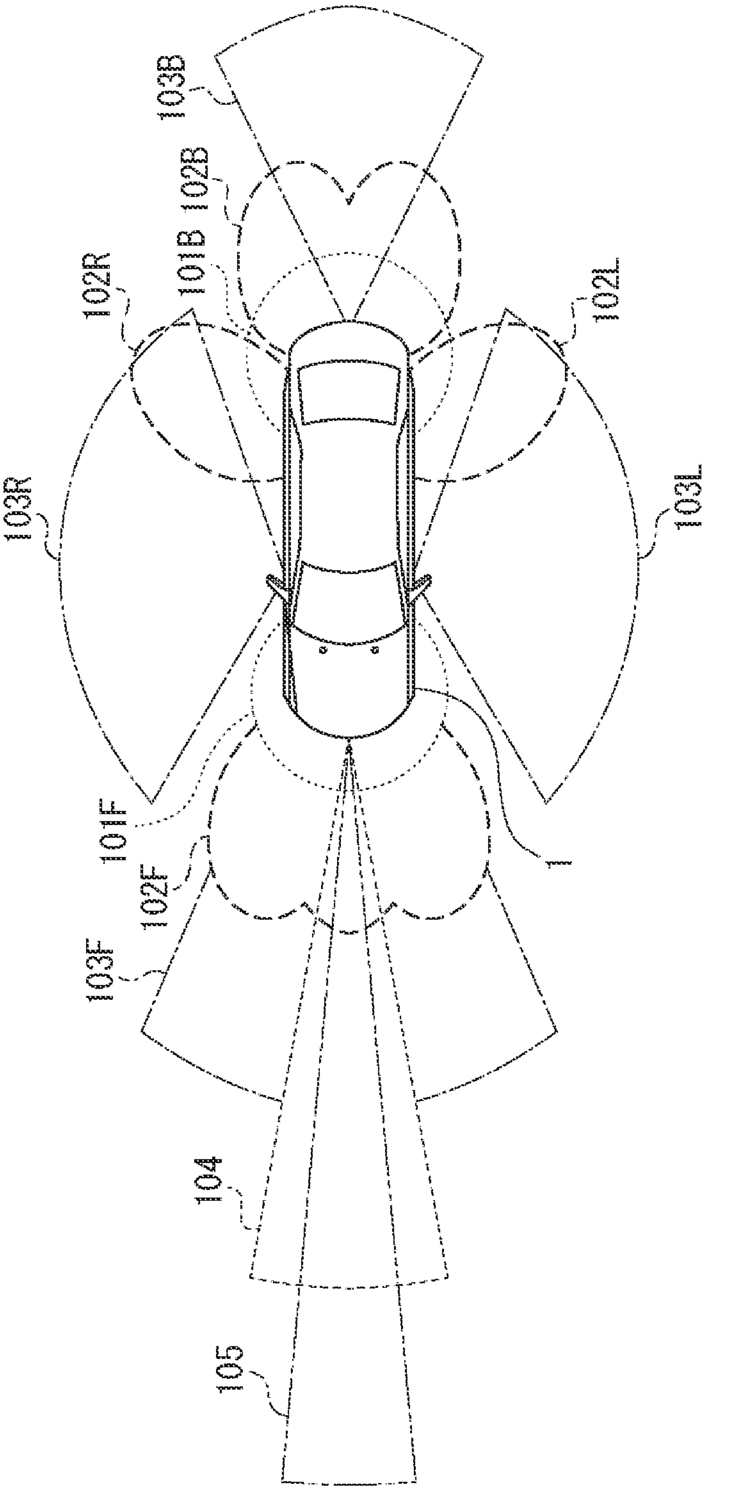
FIG. 2 is a diagram illustrating an example of sensing areas.

FIG. 2 is a diagram illustrating an example of a sensing area by the camera 51, the radar 52, the LiDAR 53, the ultrasonic sensor 54, and the like of the external recognition sensor 25 in FIG. 1. Note that FIG. 2 schematically illustrates the vehicle 1 as viewed from above, where the left end side is the front end (front) side of the vehicle 1 and the right end side is the rear end (rear) side of the vehicle 1.

A sensing area 101F and a sensing area 101B illustrate examples of sensing areas by the ultrasonic sensor 54. The sensing area 101F covers the periphery of the front end of the vehicle 1 by a plurality of the ultrasonic sensors 54. The sensing area 101B covers the periphery of the rear end of the vehicle 1 by the plurality of ultrasonic sensors 54.

Sensing results in the sensing area 101F and the sensing area 101B are used, for example, for parking assistance and the like of the vehicle 1.

Sensing areas 102F to 102B illustrate examples of sensing areas of the radar 52 for a short distance or a middle distance. The sensing area 102F covers up to a position extending farther than the sensing area 101F in front of the vehicle 1. The sensing area 102B covers up to a position extending farther than the sensing area 101B behind the vehicle 1. The sensing area 102L covers the rear periphery of the left side surface of the vehicle 1. The sensing area 102R covers the rear periphery of the right side surface of the vehicle 1.

A sensing result in the sensing area 102F is used, for example, to detect a vehicle, a pedestrian, and the like present in front of the vehicle 1. A sensing result in the sensing area 102B is used, for example, for a collision prevention function and the like behind the vehicle 1. Sensing results in the sensing areas 102L and 102R are used, for example, for detection of an object in a blind spot on the side of the vehicle 1, and the like.

Sensing areas 103F to 103B illustrate examples of sensing areas by the camera 51. The sensing area 103F covers up to a position extending farther than the sensing area 102F in front of the vehicle 1. The sensing area 103B covers up to a position extending farther than the sensing area 102B behind the vehicle 1. The sensing area 103L covers the periphery of the left side surface of the vehicle 1. The sensing area 103R covers the periphery of the right side surface of the vehicle 1.

A sensing result in the sensing area 103F can be used for, for example, recognition of a traffic light or a traffic sign, a lane departure prevention assist system, and an automatic headlight control system. A sensing result in the sensing area 103B is used for, for example, parking assistance, a surround view system, and the like. Sensing results in the sensing area 103L and the sensing area 103R can be used, for example, for a surround view system.

A sensing area 104 illustrates an example of a sensing area by the LiDAR 53. The sensing area 104 covers up to a position extending farther than the sensing area 103F in front of the vehicle 1. Meanwhile, the sensing area 104 has a narrower range in a left-right direction than the sensing area 103F.

A sensing result in the sensing area 104 is used, for example, for detecting an object such as a vehicle in the periphery.

A sensing area 105 illustrates an example of a sensing area of the radar 52 for a long distance. The sensing area 105 covers up to a position extending farther than the sensing area 104 in front of the vehicle 1. Meanwhile, the sensing area 105 has a narrower range in the left-right direction than the sensing area 104.

A sensing result in the sensing area 105 is used, for example, for adaptive cruise control (ACC), emergency braking, collision avoidance, and the like.

Note that the sensing areas of the respective sensors of the camera 51, the radar 52, the LiDAR 53, and the ultrasonic sensor 54 included in the external recognition sensor 25 may have various configurations other than those in FIG. 2. Specifically, the ultrasonic sensor 54 may also perform sensing on the sides of the vehicle 1, or the LiDAR 53 may perform sensing behind the vehicle 1. Furthermore, the installation position of each sensor is not limited to each example described above. Furthermore, the number of each of the sensors may be one or more.

2. First Embodiment

Next, a first embodiment of the present technology will be described with reference to FIGS. 3 to 10.

<Configuration Example of Information Processing System 201>

Figure 3:
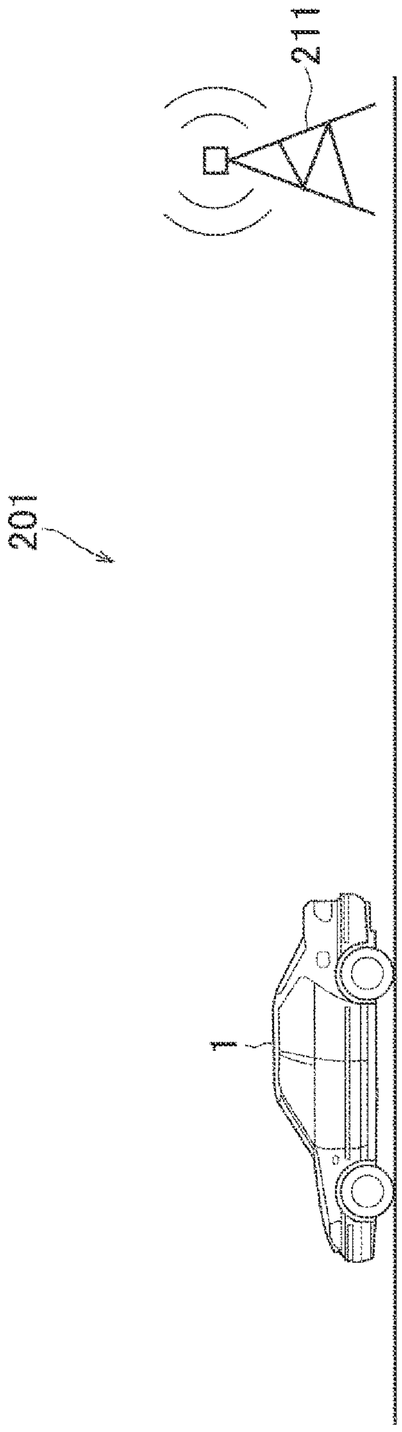
FIG. 3 is a block diagram illustrating a configuration example of an information processing system to which the present technology is applied.

FIG. 3 illustrates a configuration example of an information processing system 201 to which the present technology is applied.

The information processing system 201 includes a vehicle 1 and a base station 211. Note that, in this drawing, one vehicle 1 and one base station 211 are illustrated to simplify the description, but in the actual case, the information processing system 201 includes a plurality of the vehicles 1 and a plurality of the base stations 211.

The base station 211 is a base station of wireless communication that transmits information used for self-position estimation of the vehicle 1. Note that an example in a case where the base station 211 is a 5G base station will be described below.

The vehicle 1 communicates with a GNSS satellite (not illustrated) and the base station 211. The vehicle 1 performs self-position estimation on the basis of GNSS information obtained from the GNSS satellite and 5G information obtained from the base station 211.

The GNSS information includes, for example, information regarding time and a position of the GNSS satellite. The 5G information includes, for example, information regarding the position of the base station 211.

Furthermore, the vehicle 1 receives a reflecting body map indicating a distribution of reflecting bodies from the base station 211. The reflecting body is, for example, an object in which the reflectance of the radio wave from the radar 52 is equal to or greater than a predetermined threshold. In a case where at least one of the GNSS information and the 5G information cannot be acquired, the vehicle 1 performs self-position estimation by using the reflecting body map acquired in advance.

<Configuration Example of Self-Position Estimation Device 251>

Figure 4:
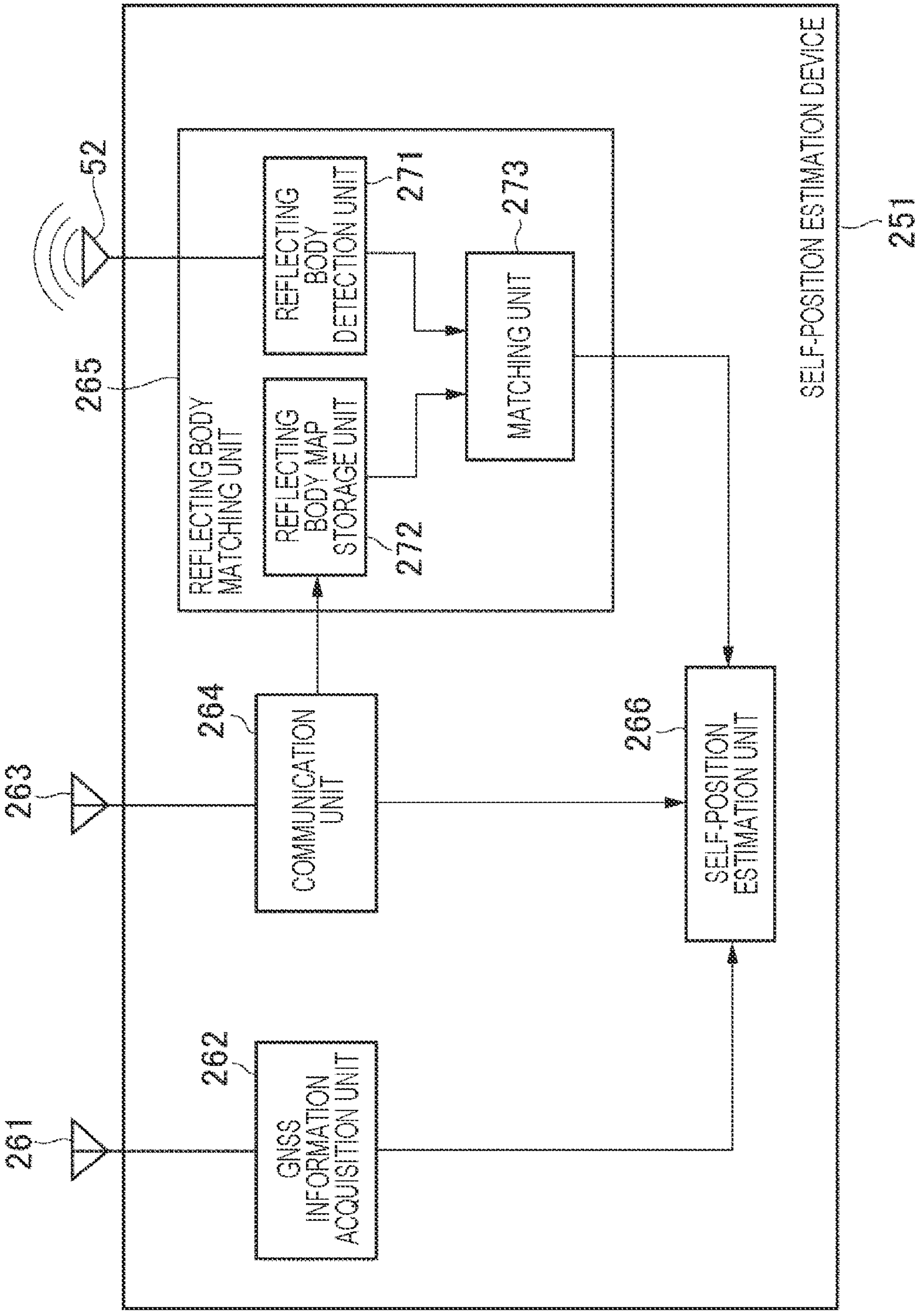
FIG. 4 is a block diagram illustrating a first embodiment of a self-position estimation device to which the present technology is applied.

FIG. 4 illustrates a configuration example of a self-position estimation device 251 to which the present technology is applied.

The self-position estimation device 251 is an information processing apparatus that is applied to the vehicle 1 and performs the self-position estimation of the vehicle 1. The self-position estimation device 251 is applicable to, for example, the position information acquisition unit 24 and the self-position estimation unit 71 of the vehicle 1 in FIG. 1.

The self-position estimation device 251 includes, for example, an antenna 261, a GNSS information acquisition unit 262, an antenna 263, a communication unit 264, a reflecting body matching unit 265, and a self-position estimation unit 266.

The GNSS information acquisition unit 262 receives a GNSS signal from a GNSS satellite via the antenna 261. The GNSS information acquisition unit 262 extracts the GNSS information from the GNSS signal and supplies the GNSS information to the self-position estimation unit 266.

The communication unit 264 communicates with the base station 211 via the antenna 263. For example, the communication unit 264 receives the 5G information from the base station 211 and supplies the 5G information to the self-position estimation unit 266. For example, the communication unit 264 receives the reflecting body map from the base station 211 and stores the reflecting body map in the reflecting body map storage unit 272 of the reflecting body matching unit 265.

The reflecting body matching unit 265 executes matching processing between a detection result of the reflecting body detected by using the radar 52 and the reflecting body map. The reflecting body matching unit 265 includes a reflecting body detection unit 271, a reflecting body map storage unit 272, and a matching unit 273.

The reflecting body detection unit 271 acquires sensor data from the radar 52 and executes processing of detecting the reflecting bodies around the vehicle 1 on the basis of the sensor data. For example, the reflecting body detection unit 271 detects a position of the reflecting body and a reflection intensity. The reflection intensity is represented by, for example, a radar cross section (RCS, radar reflection cross section). The reflecting body detection unit 271 supplies information indicating the detection result of the reflecting body to the matching unit 273.

The matching unit 273 acquires the reflecting body map from the reflecting body map storage unit 272. The matching unit 273 executes matching processing between the detection result of the reflecting body obtained by the reflecting body detection unit 271 and the reflecting body map. The matching unit 273 supplies information indicating a result of the matching processing (hereinafter, referred to as reflecting body matching information) to the self-position estimation unit 266.

The self-position estimation unit 266 performs the self-position estimation of the vehicle 1 on the basis of the GNSS position information, the 5G information, and the reflecting body matching information.

<Specific Example of Reflecting Body Map>

Next, a specific example of the reflecting body map will be described with reference to FIGS. 5 and 6.

Figure 5:
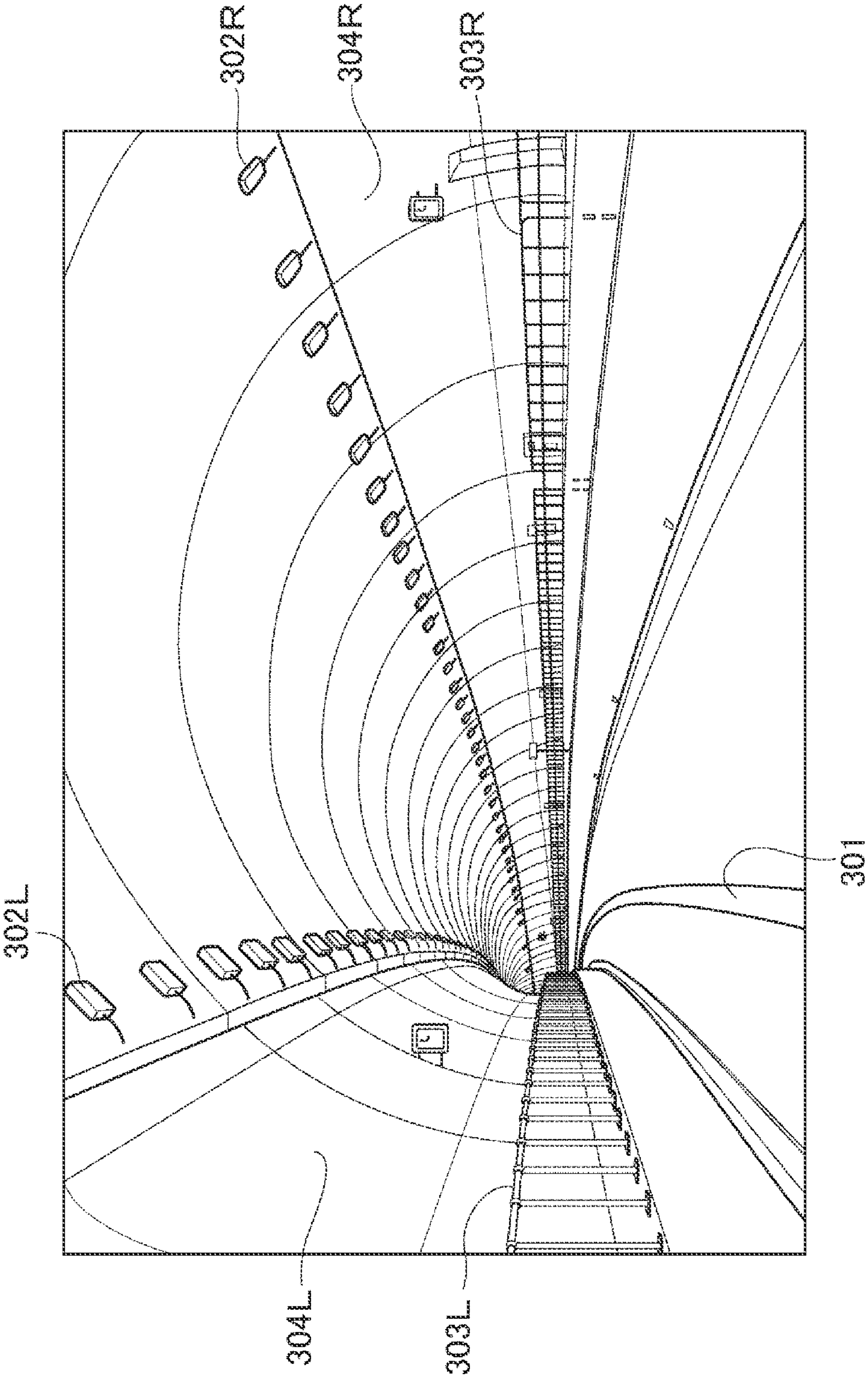
FIG. 5 is a schematic diagram illustrating an example of reflecting bodies in a tunnel.

FIG. 5 is a schematic diagram illustrating an example of reflecting bodies in a tunnel.

In this example, for example, a dividing line 301 on the road surface, left and right lightings 302L and 302R provided on the ceiling of the tunnel, left and right fences 303L and 303R, left and right walls 304L and 304R of the tunnel, and the like correspond to the reflecting bodies.

Figure 6:
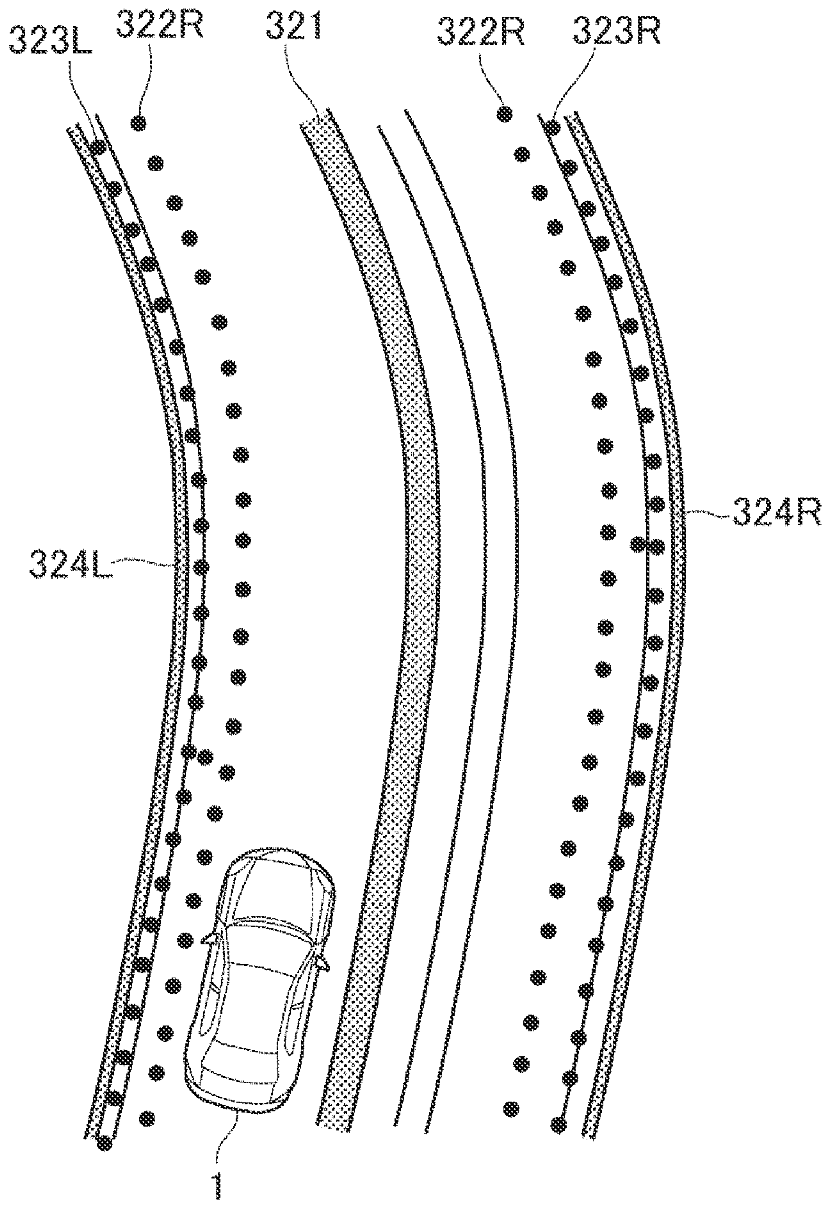
FIG. 6 is a diagram illustrating an example of a reflecting body map.

FIG. 6 is a schematic diagram illustrating an example of the reflecting body map.

In this example, positions of reflecting bodies 321 to 324R are illustrated. The reflecting body 321 corresponds to, for example, the dividing line (center line) at the center of the road. The reflecting bodies 322L and the reflecting bodies 322R correspond to, for example, the left and right lightings on the ceiling of the tunnel. The reflecting bodies 323L and the reflecting bodies 323R correspond to the right and left fences on the road. The reflecting body 324L and the reflecting body 324R correspond to, for example, the left and right walls of the tunnel.

The reflecting body map includes, for example, information regarding the reflection intensities (for example, RCSs) of the reflecting bodies 321 to 324R in addition to the positions of the reflecting bodies 321 to 324R. Note that, in a case where the reflecting body has a certain length or width such as the reflecting body 321, the reflecting body 324L, and the reflecting body 324R, for example, information regarding the reflection intensity at a plurality of positions in the reflecting body is included.

<Self-Position Estimation Processing>

Figure 7:
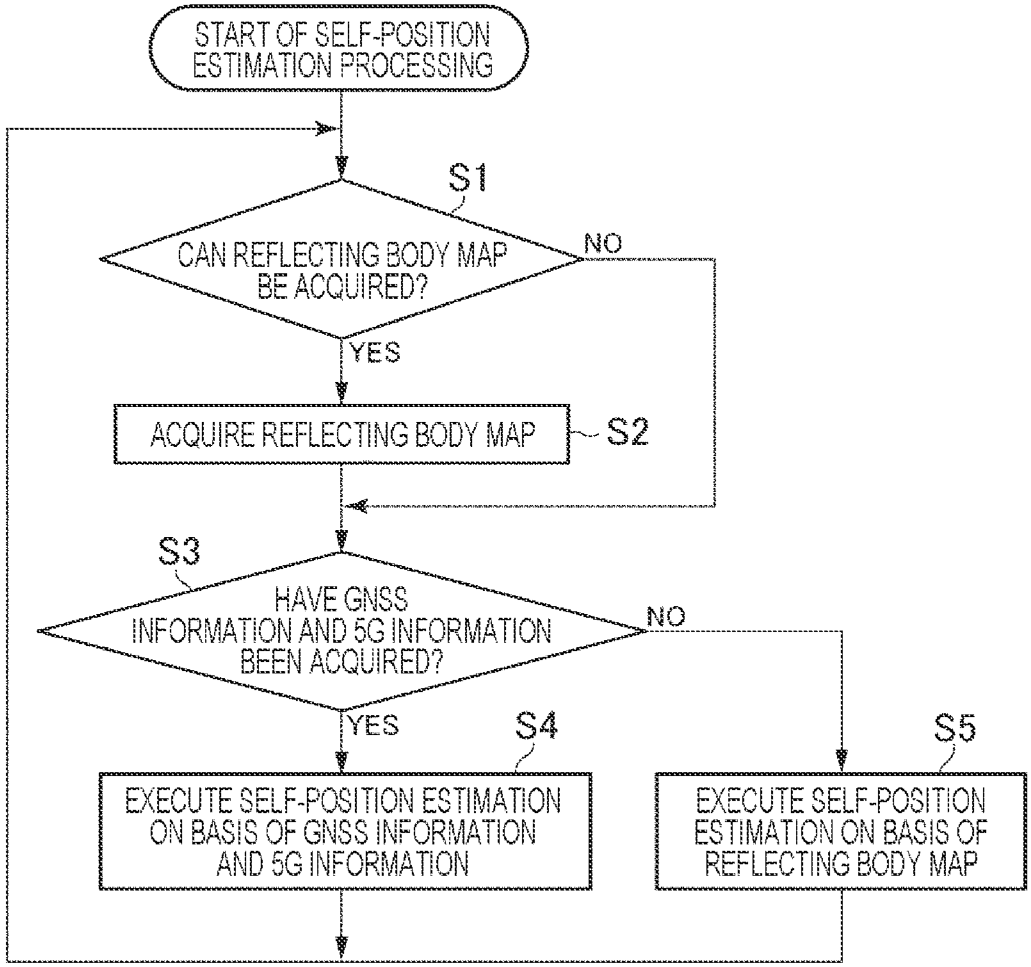
FIG. 7 is a flowchart for describing a self-position estimation processing.

Next, self-position estimation processing executed by the self-position estimation device 251 will be described with reference to a flowchart in FIG. 7.

This processing starts, for example, when power of the vehicle 1 in which the self-position estimation device 251 is provided is turned on, and ends when the power of the vehicle 1 is turned off.

In step S1, the communication unit 264 determines whether or not the reflecting body map can be acquired.

Figure 8:
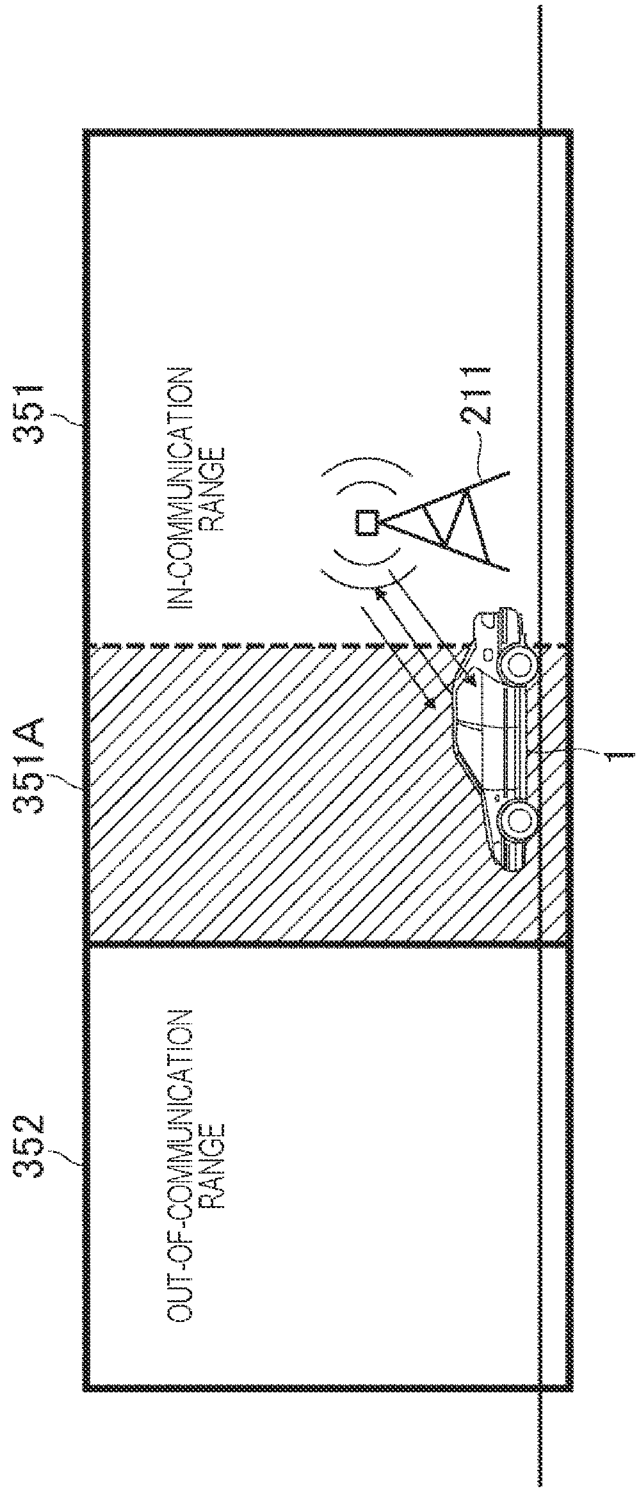
FIG. 8 is a diagram for explaining a method of acquiring the reflecting body map.

For example, as illustrated in FIG. 8, the base station 211 present in an in-communication range 351 of 5G and near a boundary 351A between the in-communication range 351 and an out-of-communication range 352 holds the reflecting body map. Then, the base station 211 holding the reflecting body map periodically transmits, for example, a signal (hereinafter, referred to as a reflecting body map holding signal) notifying that the base station holds the reflecting body map. A range of the boundary 351A can be set as appropriate, and is set to, for example, a range of about 2 km from the boundary between the in-communication range 351 and the out-of-communication range 352.

Note that the reflecting body map includes at least a distribution of reflecting bodies in the area of the out-of-communication range 352 near the base station 211.

Meanwhile, the reflecting body map does not necessarily include the distribution of the reflecting bodies in the area of the in-communication range 351. For example, the reflecting body map includes only the distribution of the reflecting bodies in the area near the boundary 351A near the base station 211 among the area of the in-communication range 351.

Therefore, an amount of information of the reflecting body map is reduced, and holding and transmission and the like of the reflecting body map becomes easy.

Furthermore, for example, only the base station 211 near the boundary 351A has the reflecting body map, and the base station 211 present at a position away from the boundary 351A does not have the reflecting body map. This prevents the self-position estimation device 251 from unnecessarily receiving the reflecting body map from the base station 211.

In a case where the communication unit 264 of the self-position estimation device 251 of the vehicle 1 receives the reflecting body map holding signal from the base station 211 via the antenna 263, the communication unit 264 determines that the reflecting body map can be acquired, and the processing proceeds to step S2.

In step S2, the communication unit 264 acquires the reflecting body map. For example, the communication unit 264 transmits a transmission request signal for requesting transmission of the reflecting body map to the base station 211 via the antenna 263.

In response, the base station 211 receives the transmission request signal and transmits the reflecting body map to the vehicle 1 correspondingly to the transmission request signal.

In response, the communication unit 264 receives the reflecting body map via the antenna 263.

The communication unit 264 stores the reflecting body map in the reflecting body map storage unit 272.

Thereafter, the processing proceeds to step S3.

Meanwhile, in step S1, in a case where the communication unit 264 has not received the reflecting body map holding signal from the base station 211, the communication unit 264 determines that the reflecting body map cannot be acquired, the processing in step S2 is skipped, and the processing proceeds to step S3.

In step S3, the self-position estimation unit 266 determines whether or not the GNSS information and the 5G information have been acquired.

For example, in a case where the communication can be performed with the GNSS satellite via the antenna 261, the GNSS information acquisition unit 262 receives the GNSS signal from the GNSS satellite. The GNSS information acquisition unit 262 extracts the GNSS information from the GNSS signal and supplies the GNSS information to the self-position estimation unit 266.

In a case where the communication can be performed with the base station 211 via the antenna 263, the communication unit 264 receives the 5G information from the base station 211. The communication unit 264 supplies the 5G information to the self-position estimation unit 266.

In response, the self-position estimation unit 266 determines that the GNSS information and the 5G information have been acquired, and the processing proceeds to step S4.

In step S4, the self-position estimation unit 266 executes the self-position estimation on the basis of the GNSS information and the 5G information. For example, the self-position estimation unit 266 estimates the position of the vehicle 1 on the basis of time indicated by the GNSS information from a plurality of GNSS satellites and the position of each GNSS satellite. Furthermore, for example, the self-position estimation unit 266 corrects the position of the vehicle 1 estimated on the basis of the GNSS information, on the basis of the position of each base station 211 indicated in the 5G information from the plurality of base stations 211.

Thereafter, the processing returns to step S1, and the processing in step S1 and the subsequent steps is executed.

Meanwhile, in a case where it is determined in step S3 that at least one of the GNSS information and the 5G information has not been acquired, the processing proceeds to step S5.

Figure 9:
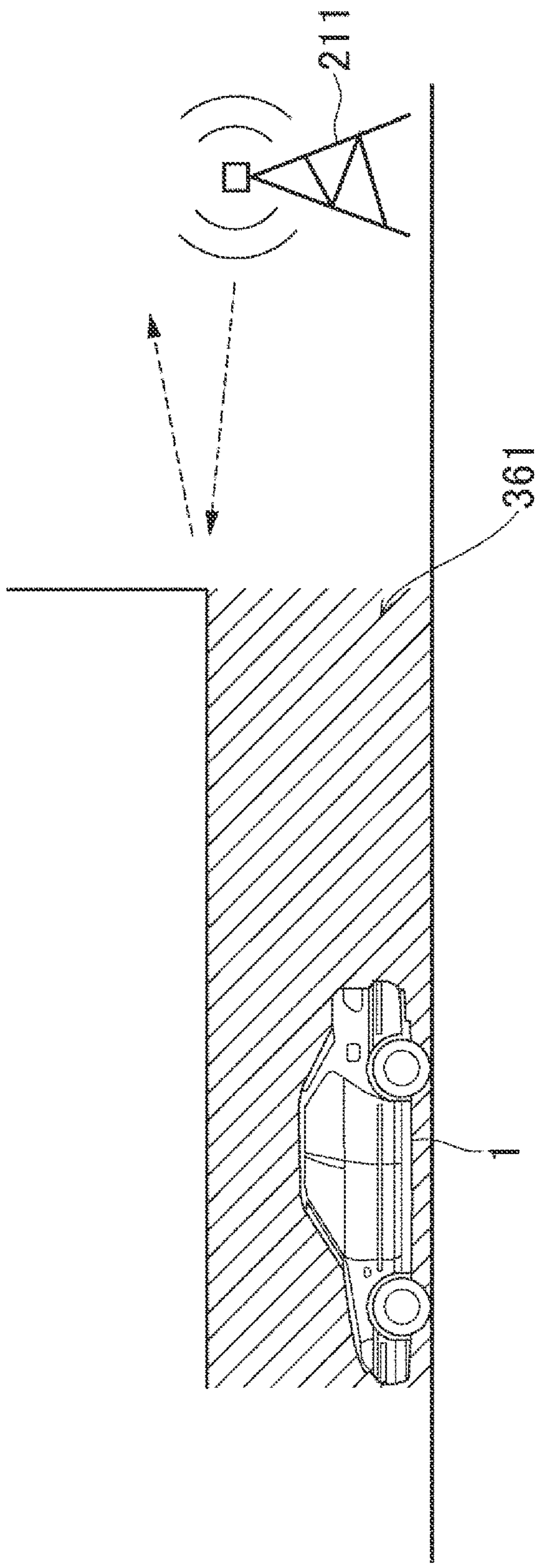
FIG. 9 is a diagram illustrating an example of a place where radio waves from a GNSS satellite and a 5G base station do not reach.
Figure 10:
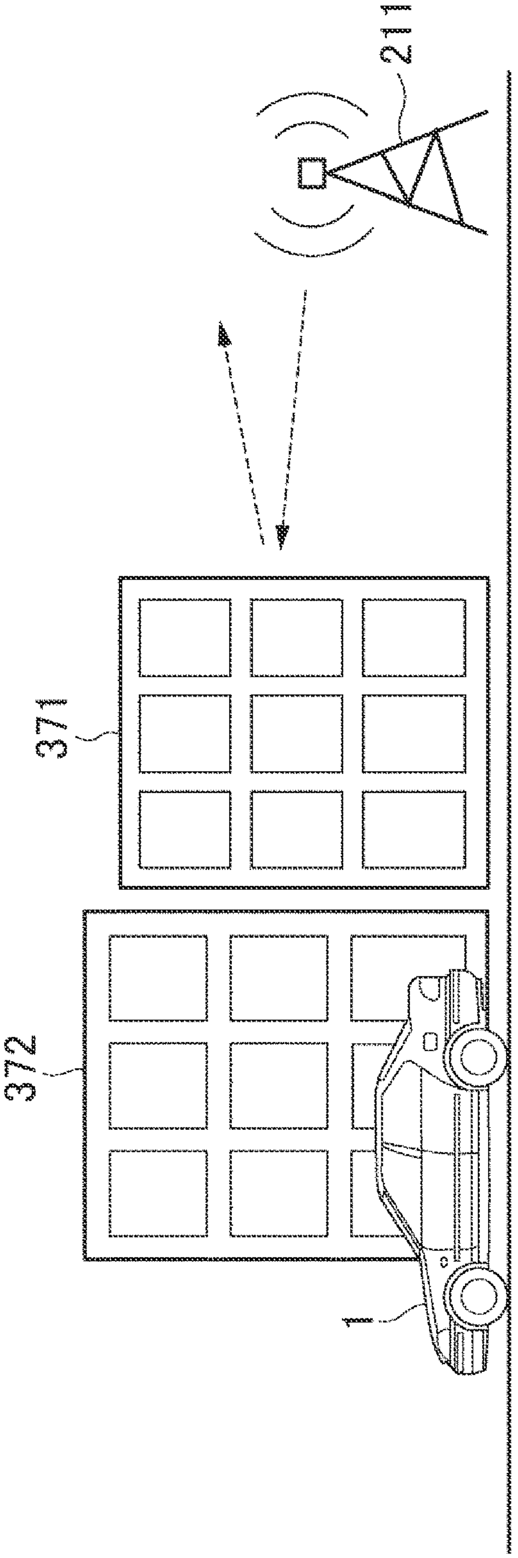
FIG. 10 is a diagram illustrating an example of a place where radio waves from a GNSS satellite and a 5G base station do not reach.

FIGS. 9 and 10 illustrate examples of a case where the vehicle 1 cannot acquire at least one of the GNSS information and the 5G information.

For example, as illustrated in FIG. 9, in a case where the vehicle 1 is traveling in a tunnel 361, radio waves from the GNSS satellite and the base station 211 do not reach the vehicle 1, and the vehicle 1 cannot acquire the GNSS information and the 5G information.

For example, as illustrated in FIG. 10, in a case where the vehicle 1 is traveling through a group of buildings including a building 371, a building 372, and the like, radio waves from the GNSS satellite and the base station 211 do not reach the vehicle 1, and the vehicle 1 cannot acquire the GNSS information and the 5G information. Alternatively, multipath occurs due to the group of buildings to cause the positioning accuracy to be greatly reduced.

In step S5, the self-position estimation device 251 executes the self-position estimation on the basis of the reflecting body map. Specifically, the reflecting body detection unit 271 detects the position and the reflection intensity of each of the reflecting bodies around the vehicle 1 on the basis of the sensor data from the radar 52. The reflecting body detection unit 271 supplies information indicating the detection result of the reflecting body to the matching unit 273.

The matching unit 273 executes matching processing between the reflecting body map stored in the reflecting body map storage unit 272 and the detection result of the reflecting body obtained by the reflecting body detection unit 271. For example, the matching unit 273 performs matching between the position and the reflection intensity of the reflecting body on the reflecting body map and the position and the reflection intensity of the reflecting body detected by the reflecting body detection unit 271. The matching unit 273 supplies the reflecting body matching information indicating the result of the matching processing to the self-position estimation unit 266.

The self-position estimation unit 266 estimates the position of the vehicle 1 on the basis of the reflecting body matching information. For example, the self-position estimation unit 266 estimates the position of the vehicle 1 on the reflecting body map on the basis of the result of the matching processing. Then, the self-position estimation unit 266 converts the estimated position of the vehicle 1 on the reflecting body map into a position in the world coordinate system.

Thereafter, the processing returns to step S1, and the processing in step S1 and the subsequent steps is executed.

As described above, the self-position estimation device 251 can perform the self-position estimation of the vehicle 1 even if at least one of the GNSS information and the 5G information cannot be acquired. Furthermore, as compared with the case of integrating the amount of change in the position of the vehicle 1 by using the IMU, because the estimation error of the position of the vehicle 1 is not accumulated, the accuracy of the self-position estimation of the vehicle 1 is improved.

Moreover, the reflecting body map is supplied from the base station 211 only in the in-communication range of 5G and near the boundary between the in-communication range and the out-of-communication range. Furthermore, the reflecting body map hardly includes the distribution of the reflecting bodies in the area in the in-communication range of 5G. This can reduce the amount of information of the reflecting body map acquired by the vehicle 1 without reducing the accuracy of self-position estimation of the vehicle 1. Furthermore, the cost required for generating and providing the reflecting body map can be reduced.

3. Second Embodiment

Next, a third embodiment of the present technology will be described with reference to FIG. 11.

<Configuration Example of Self-Position Estimation Device 401>

Figure 11:
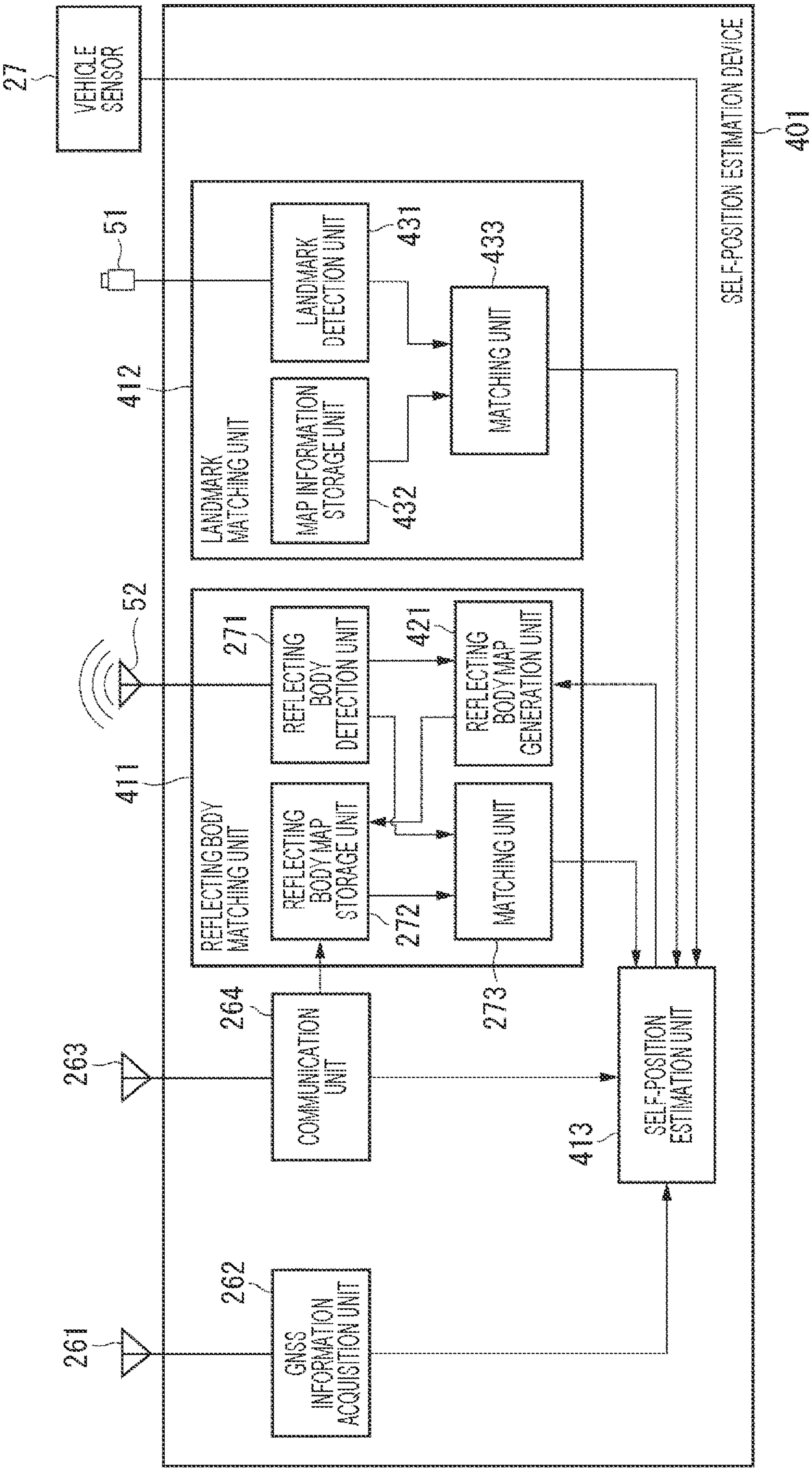
FIG. 11 is a block diagram illustrating a second embodiment of a self-position estimation device to which the present technology is applied.

FIG. 11 illustrates a configuration example of a self-position estimation device 401 to which the present technology is applied. Note that, in the drawing, portions corresponding to those of the information processing system 201 in FIG. 4 are denoted by the same reference signs, and a description thereof will be omitted as appropriate.

The self-position estimation device 401 is identical to the self-position estimation device 251 in that the self-position estimation device includes, for example, an antenna 261, a GNSS information acquisition unit 262, an antenna 263, and a communication unit 264. Meanwhile, the self-position estimation device 401 is different from the self-position estimation device 251 in that a reflecting body matching unit 411 and a self-position estimation unit 413 are provided instead of the reflecting body matching unit 265 and the self-position estimation unit 266, and a landmark matching unit 412 is added.

The reflecting body matching unit 411 has a configuration in which a reflecting body map generation unit 421 is added to the reflecting body matching unit 265 in FIG. 4.

The landmark matching unit 412 executes matching processing between a detection result of a landmark detected by using an image captured by a camera 51 and map information. The landmark matching unit 412 includes a landmark detection unit 431, a map information storage unit 432, and a matching unit 433.

The landmark detection unit 431 acquires image data from the camera 51 and executes processing of detecting the landmarks around a vehicle 1 on the basis of the image data. For example, the landmark detection unit 431 detects a position and a type of each of the landmarks around the vehicle 1. The landmark detection unit 431 supplies information indicating the detection result of the landmark to the matching unit 433. Note that the means for acquiring the image data is not limited to the camera 51, and may be LiDAR or the like.

The matching unit 433 acquires map information indicating the distribution of the landmarks from the map information storage unit 432. The map information includes, for example, information regarding the position and the type of the landmark. The matching unit 433 executes matching processing between the detection result of the landmark obtained by the landmark detection unit 431 and the map information. For example, the matching unit 433 performs matching between the position and the type of the matching detected by the landmark detection unit 431 and the position and the type of the landmark on the map information. The matching unit 433 supplies information indicating a result of the matching processing (hereinafter, referred to as landmark matching information) to the self-position estimation unit 413.

The self-position estimation unit 413 executes self-position estimation of the vehicle 1 by a method similar to that of the self-position estimation unit 266 in FIG. 4. In addition, the self-position estimation unit 413 executes self-position estimation of the vehicle 1 on the basis of, for example, sensor data from a vehicle sensor 27 and the landmark matching information.

For example, the self-position estimation unit 413 acquires sensor data indicating the acceleration and the angular velocity of the vehicle 1 from an IMU included in the vehicle sensor 27. Furthermore, the self-position estimation unit 413 acquires sensor data indicating the rotation speed of wheels from a wheel speed sensor included in the vehicle sensor 27. For example, the self-position estimation unit 413 estimates the position of the vehicle 1 by detecting and integrating the amount of change in the position of the vehicle 1 on the basis of the acceleration and the angular velocity of the vehicle 1 and the rotation speed of the wheels.

However, in the method using only the IMU, the estimation accuracy of the position of the vehicle 1 decreases due to accumulation of the estimation error based on the error of the sensor data. On the other hand, for example, the self-position estimation unit 413 appropriately corrects the estimation result of the position of the vehicle 1 on the basis of the information obtained by the IMU and the landmark matching information.

In the second embodiment, the self-position estimation device 401 generates a reflecting body map of an area where no reflecting body map is present.

Specifically, for example, similarly to the self-position estimation device 251, the self-position estimation device 401 estimates the position of the vehicle 1 on the basis of the GNSS information and the 5G information in a case where the GNSS information and the 5G information can be acquired.

Furthermore, in a case where at least one of the GNSS information and the 5G information cannot be acquired and the vehicle 1 has a reflecting body map corresponding to a traveling area, similarly to the self-position estimation device 251, the self-position estimation device 401 estimates the position of the vehicle 1 by using the reflecting body map. This applies in a case where the self-position estimation device 401 has already acquired the reflecting body map from a base station 211 or in a case where the reflecting body map has already been generated.

Meanwhile, in a case where at least one of the GNSS information and the 5G information cannot be acquired and the vehicle 1 does not have the reflecting body map corresponding to the traveling area, the self-position estimation device 401 generates the reflecting body map.

Specifically, for example, the self-position estimation unit 413 executes self-position estimation of the vehicle 1 on the basis of, for example, the sensor data of the vehicle sensor 27 and the landmark matching information. The self-position estimation unit 413 supplies information indicating the estimation result of the position of the vehicle 1 to the reflecting body map generation unit 421.

A reflecting body detection unit 271 executes the detecting processing of the reflecting bodies around the vehicle 1 on the basis of the sensor data from a radar 52. The reflecting body detection unit 271 supplies information indicating the detection result of the reflecting body to the reflecting body map generation unit 421.

Then, the reflecting body map generation unit 421 generates the reflecting body map on the basis of the estimation result of the position of the vehicle 1 and the detection result of the reflecting body. The reflecting body map generation unit 421 stores the generated reflecting body map in a reflecting body map storage unit 272.

With this arrangement, for example, in a case where the vehicle 1 travels in the area among the area of the out-of-communication range of 5G where the reflecting body map is not provided, the reflecting body map of the area is generated. Then, even if the reflecting body map is not provided from the base station 211, the self-position estimation device 401 can perform self-position estimation of the vehicle 1 by using the reflecting body map.

Note that, for example, the self-position estimation device 401 may generate all the reflecting body maps to be used without acquiring the reflecting body map from the base station 211.

Furthermore, for example, each vehicle 1 may upload the generated reflecting body map to a server or the like and share the reflecting body map with other vehicles 1.

4. Modifications

Hereinafter, modifications of the embodiments of the present technology described above will be described.

<Modification Regarding Reflecting Body Map and Reflecting Body>

In the above description, an example has been described in which the reflecting body map includes the information regarding the position of the reflecting body and the reflection intensity, but information other than the position of the reflecting body can be changed.

For example, the reflecting body map may include information regarding at least one of the shape and the vibration frequency of the reflecting body. For example, the reflecting body map may include information regarding the position and the shape of the reflecting body.

Note that regardless of the type of information included in the reflecting body map, the reflecting body detection unit 271 detects information similar to the information included in the reflecting body map for the reflecting bodies around the vehicle 1. For example, in a case where the reflecting body map includes information regarding at least one of the shape and the vibration frequency of the reflecting body, the reflecting body detection unit 271 detects at least one of the shape and the vibration frequency of the reflecting body. Furthermore, the matching unit 273 executes the matching processing between the information regarding the reflecting body detected by the reflecting body detection unit 271 and the information regarding the reflecting body included in the reflecting body map.

For example, in order to improve the accuracy of self-position estimation using a reflecting body map, a reflecting body for self-position estimation may be installed in an area where the GNSS information and the 5G information are difficult to be acquired. For example, a reflecting body marker that is a reflecting body having a predetermined shape may be installed.

Figure 12:
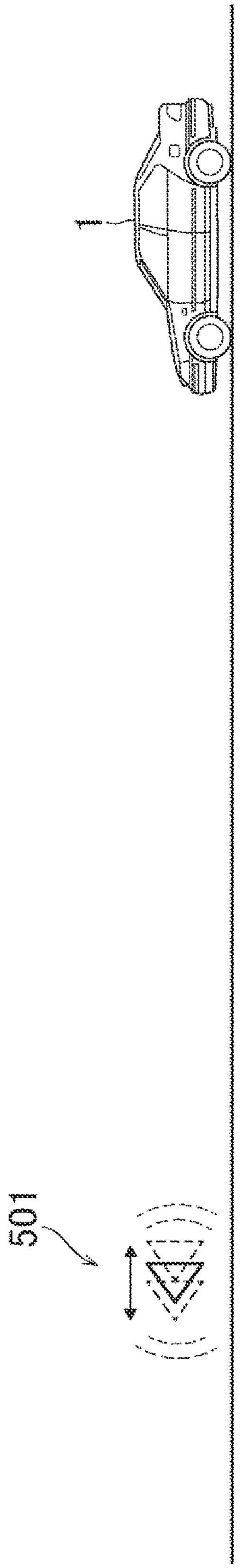
FIG. 12 is a diagram illustrating an example of a reflecting body marker.
Figure 13:
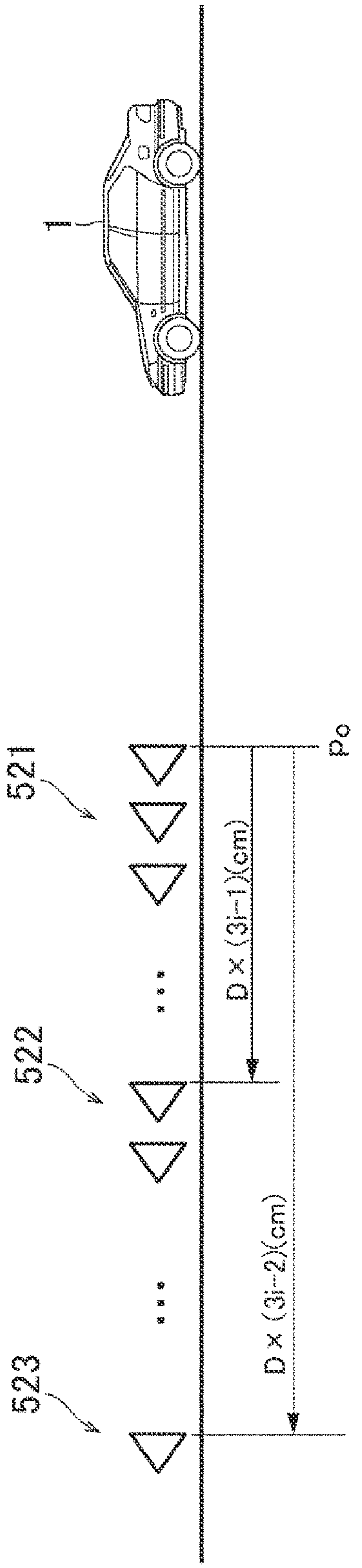
FIG. 13 is a diagram illustrating an example of a reflecting body marker.

FIGS. 12 and 13 illustrate examples of the reflecting body markers.

For example, in a case where the vibration frequency of the reflecting bodies is used for the matching processing, as illustrated in FIG. 12, a reflecting body marker that vibrates in a predetermined vibration pattern may be installed.

For example, as illustrated in FIG. 13, reflecting body markers may be regularly disposed in a predetermined pattern. For example, the reflecting body markers may be repeatedly disposed at a predetermined interval of D (cm). Furthermore, for example, reflecting body markers of a plurality of patterns may be regularly and repeatedly disposed.

For example, in the example in FIG. 13, a reflecting body marker 521 in which three triangular reflecting bodies are arranged in the horizontal direction is disposed at a position of D×3i (i=0, 1, 2, . . . , N) (cm) from a predetermined reference position Po. A reflecting body marker 522 in which two triangular reflecting bodies are arranged in the horizontal direction is disposed at a position of D×3 (i−1) (cm) from the reference position. A reflecting body marker 523 including one triangular reflecting body is disposed at a position of D×3 (i−2) (cm) from the reference position.

For example, the reflecting body map may be provided from other than the base station 211. Specifically, for example, the reflecting body map may be provided from a roadside device, an access point of wireless communication, or the like.

For example, not only the base station 211 near the boundary between the in-communication range and the out-of-communication range but also other base stations 211 may provide the reflecting body map.

For example, a reflecting body map indicating the distribution of the reflecting bodies in an area in the in-communication range of 5G may also be provided. In this case, for example, even in a case where the vehicle 1 cannot communicate with the base station 211 in the in-communication range of 5G due to an abnormality of the communication unit 264 or the like, the vehicle 1 can execute self-position estimation on the basis of the reflecting body map.

For example, the vehicle 1 may acquire the reflecting body map from a server or the like in advance before traveling.

For example, the reflecting body map may be combined with map information used by the vehicle 1 for automated driving. For example, the distribution of reflecting bodies may be indicated in the map information.

Other Modifications

For example, in a case where it is determined that the vehicle is approaching the out-of-communication range of 5G on the basis of map information, information from the base station 211, or the like, the self-position estimation device 251 or the communication unit 264 of the self-position estimation device 401 may request the base station 211 to transmit the reflecting body map and receive the reflecting body map from the base station 211.

For example, the reflecting body may be detected by a sensor using an electromagnetic wave other than the radar 52.

In the above description, an example has been described in which the position of the vehicle 1 is estimated in the self-position estimation of the vehicle 1, but the attitude of the vehicle 1 can also be estimated.

In the above description, an example has been described in which the self-position estimation is executed on the basis of the reflecting body map in a case where at least one of the GNSS information and the 5G information cannot be acquired. However, for example, in a case where the GNSS information can be acquired, the self-position estimation can be executed on the basis of the GNSS information even if the 5G information cannot be acquired.

For example, a method other than the above-described method can be used for the self-position estimation used in the case of generating the reflecting body map.

For example, information acquired from a base station of wireless communication of a system other than 5G may be used for the self-position estimation.

The present technology can also be applied to a case where a moving body other than the vehicle 1 executes self-position estimation on the basis of the GNSS information and information acquired from a base station of wireless communication. For example, the present technology can also be applied to self-position estimation of a mobile body such as a flying car, a robot, or a drone.

5. Others

<Configuration Example of Computer>

The above-described series of processing can be executed by hardware and can also be executed by software. In a case where the series of processing is executed by software, a program constituting the software is installed in a computer. Here, examples of the computer include a computer incorporated in dedicated hardware, and for example, a general-purpose personal computer that can execute various functions by installing various programs.

Figure 14:
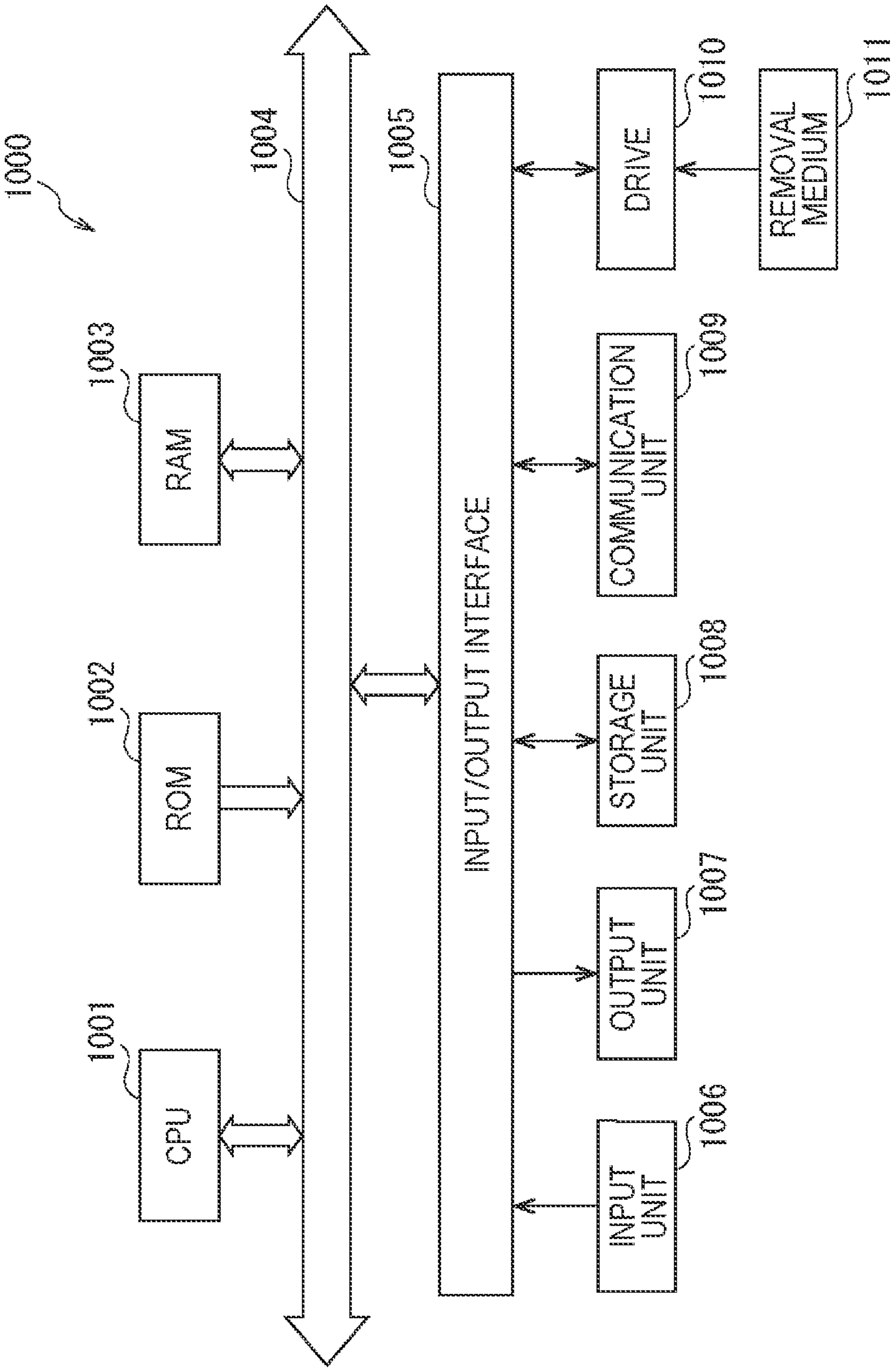
FIG. 14 is a block diagram illustrating a configuration example of a computer.

FIG. 14 is a block diagram illustrating a configuration example of hardware of a computer that executes the above-described series of processing by a program.

In a computer 1000, a central processing unit (CPU) 1001, a read only memory (ROM) 1002, and a random access memory (RAM) 1003 are interconnected with a bus 1004.

Moreover, an input/output interface 1005 is connected to the bus 1004. An input unit 1006, an output unit 1007, a storage unit 1008, a communication unit 1009, and a drive 1010 are connected to the input/output interface 1005.

The input unit 1006 includes an input switch, a button, a microphone, an imaging element and the like. The output unit 1007 includes a display, a speaker, and the like. The storage unit 1008 includes a hard disk, a non-volatile memory, and the like. The communication unit 1009 includes a network interface and the like. The drive 1010 drives a removable medium 1011 such as a magnetic disk, an optical disc, a magneto-optical disk, or a semiconductor memory.

In the computer 1000 configured as described above, the series of processing described above is performed, for example, by the CPU 1001 loading a program stored in the storage unit 1008 into the RAM 1003 via the input/output interface 1005 and the bus 1004, and executing the program.

The program executed by the computer 1000 (CPU 1001) can be provided, for example, by being recorded in the removable medium 1011 as a package medium and the like. Furthermore, the program can be provided via a wired or wireless transmission medium such as a local area network, the Internet, or digital satellite broadcasting.

In the computer 1000, the program can be installed in the storage unit 1008 via the input/output interface 1005 by mounting the removable medium 1011 on the drive 1010. Furthermore, the program can be received by the communication unit 1009 via a wired or wireless transmission medium and installed in the storage unit 1008. In addition, the program can be installed in the ROM 1002 or the storage unit 1008 in advance.

Note that, the program to be executed by the computer may be a program that is processed in time series in the order described herein, or may be a program that is processed in parallel or at required timings such as when a call is made.

Furthermore, in the present description, a system is intended to mean assembly of a plurality of components (apparatuses, modules (parts), and the like), and it does not matter whether or not all the components are in the same housing. Therefore, a plurality of devices housed in separate housings and connected via a network, and one device having a plurality of modules included in one housing are both systems.

Moreover, the embodiments of the present technology are not limited to the above-described embodiments, and a variety of modifications can be made without departing from the gist of the present technology.

For example, the present technology may be configured as cloud computing in which one function is shared and processed in cooperation by a plurality of devices via a network.

Furthermore, each step described in the flowchart described above can be carried out by one device or by a plurality of devices in a shared manner.

Moreover, in a case where a plurality of types of processing is included in one step, the plurality of types of processing included in the one step can be performed by one device or by a plurality of devices in a shared manner.

Combination Examples of Configurations

The present technology may also have the following configurations.

(1)

An information processing apparatus including:

a communication unit that performs communication with a base station of wireless communication that transmits information used for self-position estimation of a vehicle; and a self-position estimation unit that performs self-position estimation of the vehicle on the basis of a reflecting body map indicating a distribution of reflecting bodies in a case where the communication with the base station is not possible.

(2)

The information processing apparatus according to (1), in which the communication unit receives the reflecting body map from the base station.

(3)

The information processing apparatus according to (2), in which the communication unit receives the reflecting body map from the base station in an in-communication range of the wireless communication and near a boundary between the in-communication range and an out-of-communication range of the wireless communication.

(4)

The information processing apparatus according to (3), in which the reflecting body map includes a distribution of the reflecting bodies in an area of the out-of-communication range.

(5)

The information processing apparatus according to (3) or (4), in which, in a case where the communication unit is notified by the base station that the base station holds the reflecting body map, the communication unit requests the base station to transmit the reflecting body map.

(6)

The information processing apparatus according to (3) or (4), in which the communication unit receives the reflecting body map from the base station in a case where it is determined that the vehicle is approaching the out-of-communication range.

(7)

The information processing apparatus according to any one of (1) to (6), in which the self-position estimation unit performs self-position estimation of the vehicle on the basis of a result of matching processing between a detection result of the reflecting bodies around the vehicle and the reflecting body map.

(8)

The information processing apparatus according to (7), further including a reflecting body detection unit that detects the reflecting bodies around the vehicle; and a matching unit that performs the matching processing.

(9)

The information processing apparatus according to (8), in which the reflecting body map includes information regarding a position and reflection intensity of each of the reflecting bodies, and the reflecting body detection unit detects a position and reflection intensity of each of the reflecting bodies.

(10)

The information processing apparatus according to (9), in which the reflecting body map further includes at least one of information regarding a shape and a vibration frequency of each of the reflecting bodies, and the reflecting body detection unit detects at least one of the shape and the vibration frequency of each of the reflecting bodies.

(11)

The information processing apparatus according to any one of (8) to (10), further including a reflecting body map generation unit that generates the reflecting body map on the basis of a detection result of the reflecting bodies by the reflecting body detection unit in an out-of-communication range of the wireless communication.

(12)

The information processing apparatus according to any one of (1) to (11), in which the self-position estimation unit performs self-position estimation of the vehicle in an in-communication range of the wireless communication on the basis of information from the base station.

(13)

The information processing apparatus according to (12), in which the self-position estimation unit performs self-position estimation of the vehicle on the basis of global navigation satellite system (GNSS) information from a GNSS satellite and information from the base station in an in-communication range of the wireless communication.

(14)

The information processing apparatus according to (13), in which, in a case where the self-position estimation unit cannot acquire the GNSS information from the GNSS satellite or cannot communicate with the base station, the self-position estimation unit performs self-position estimation of the vehicle on the basis of the reflecting body map.

(15)

The information processing apparatus according to (13) or (14), in which the self-position estimation unit corrects a position of the vehicle estimated on the basis of the GNSS information, on the basis of information from the base station.

(16)

The information processing apparatus according to any one of (1) to (15), in which the wireless communication is wireless communication based on the fifth generation mobile communication system (5G).

(17)

An information processing method including:

performing communication with a base station of wireless communication that transmits information used for self-position estimation of a vehicle; and performing self-position estimation of the vehicle on the basis of a reflecting body map indicating a distribution of reflecting bodies in a case where the communication with the base station is not possible.

(18)

An information processing system including:

a base station of wireless communication that transmits information used for self-position estimation of a vehicle; and an information processing apparatus that performs self-position estimation of the vehicle, in which the information processing apparatus includes:

a communication unit that performs communication with the base station; and a self-position estimation unit that performs self-position estimation of the vehicle on the basis of a reflecting body map indicating a distribution of reflecting bodies in a case where the communication with the base station is not possible.

Note that the effects described herein are merely examples and are not limited, and other effects may be provided.

REFERENCE SIGNS LIST

1 Vehicle
11 Vehicle control system
24 Position information acquisition unit
51 Camera
52 Radar
71 Self-position estimation unit
201 Information processing system
211 Base station
251 Self-position estimation device
262 GNSS information acquisition unit
264 Communication unit

265 Reflecting body matching unit
266 Self-position estimation unit
271 Reflecting body detection unit
272 Matching unit
401 Self-position estimation device
411 Reflecting body matching unit
412 Landmark matching unit
413 Self-position estimation unit
421 Reflecting body map generation unit
431 Landmark detection unit
433 Matching unit

The invention claimed is:

1. An information processing apparatus, comprising:

circuitry configured to:

communicate with a base station of wireless communication, wherein the information processing apparatus is associated with a vehicle, and the base station transmits information usable for self-position estimation of the vehicle;

receive, based on the communication with the base station, a first reflecting body map in an area of an in-communication range of the wireless communication, wherein the area is in vicinity of a boundary between the in-communication range and an out-of-communication range of the wireless communication, and the received first reflecting body map indicates a distribution of first reflecting bodies; and execute, based on the received first reflecting body map, the self-position estimation of the vehicle in a case where the communication with the base station fails.

2. The information processing apparatus according to claim 1, wherein the reflecting body map includes the distribution of the first reflecting bodies in an area of the out-of-communication range.

3. The information processing apparatus according to claim 1, wherein the base station further transmits a notification indicating that the base station holds the first reflecting body map, and the circuitry is further configured to transmit, based on reception of the notification, a request to the base station for transmission of the first reflecting body map.

4. The information processing apparatus according to claim 1, wherein the circuitry is further configured to:

determine that the vehicle is in vicinity of the out-of-communication range; and receive, based on the determination that the vehicle is in the vicinity of the out-of-communication range, the first reflecting body map from the base station.

5. The information processing apparatus according to claim 1, wherein the first reflecting bodies are around the vehicle, and the circuitry is further configured to:

obtain a result of a matching process between the first reflecting body map and a detection result of the first reflecting bodies; and execute the self-position estimation of the vehicle based on the obtained result of the matching process.

6. The information processing apparatus according to claim 5, wherein the circuitry is further configured to:

detect the first reflecting bodies;

obtain the detection result of the first reflecting bodies based on the detection of the first reflecting bodies; and execute the matching process between the first reflecting body map and the detection result of the first reflecting bodies.

7. The information processing apparatus according to claim 6, wherein the first reflecting body map includes information indicating:

a first position of each first reflecting body of the first reflecting bodies, and a first reflection intensity of each first reflecting body of the first reflecting bodies, and the circuitry is further configured to detect each of:

a second position of each first reflecting body of the first reflecting bodies, and a second reflection intensity of each first reflecting body of the first reflecting bodies.

8. The information processing apparatus according to claim 7, wherein the first reflecting body map further includes information indicating at least one of:

a shape of each first reflecting body of the first reflecting bodies, or a vibration frequency of each first reflecting body of the first reflecting bodies, and the circuitry is further configured to detect at least one of:

the shape of each first reflecting body of the first reflecting bodies, or the vibration frequency of each first reflecting body of the first reflecting bodies.

9. The information processing apparatus according to claim 6, wherein the circuitry is further configured to:

detect second reflecting bodies in the out-of-communication range;

obtain a detection result of the second reflecting bodies based on the detection of the second reflecting bodies; and generate a second reflecting body map based on the detection result of the second reflecting bodies.

10. The information processing apparatus according to claim 1, wherein the circuitry is further configured to:

receive the information from the base station; and execute, based on the received information, the self-position estimation of the vehicle in the in-communication range of the wireless communication.

11. The information processing apparatus according to claim 10, wherein the circuitry is further configured to:

receive global navigation satellite system (GNSS) information from a GNSS satellite; and execute, in the in-communication range of the wireless communication, the self-position estimation of the vehicle based on each:

the received GNSS information, and the received information.

12. The information processing apparatus according to claim 11, wherein the circuitry is further configured to:

determine at least one of the GNSS information is unavailable from the GNSS satellite or the information is unavailable from the base station; and execute the self-position estimation of the vehicle based on:

the determination that the at least one of the GNSS information is unavailable from the GNSS satellite or the information is unavailable from the base station, and the received first reflecting body map.

13. The information processing apparatus according to claim 11, wherein the circuitry is further configured to:

estimate a position of the vehicle based on the received GNSS information; and correct the estimated position of the vehicle based on the received information.

14. The information processing apparatus according to claim 1, wherein the wireless communication is associated with a fifth generation mobile communication system (5G).

15. An information processing method, comprising:

in an information processing apparatus:

communicating with a base station of wireless communication, wherein the information processing apparatus is associated with a vehicle, and the base station transmits information usable for self-position estimation of the vehicle;

receiving, based on the communication with the base station, a reflecting body map in an area of an in-communication range of the wireless communication, wherein the area is in vicinity of a boundary between the in-communication range and an out-of-communication range of the wireless communication, and the received reflecting body map indicates a distribution of reflecting bodies; and executing, based on the received reflecting body map, the self-position estimation of the vehicle in a case where the communication with the base station fails.

16. An information processing system, comprising:

a base station of wireless communication configured to transmit information usable for self-position estimation of a vehicle; and an information processing apparatus associated with the vehicle, wherein the information processing apparatus comprises circuitry configured to:

communicate with the base station;

receive, based on the communication with the base station, a reflecting body map in an area of an in-communication range of the wireless communication, wherein the area is in vicinity of a boundary between the in-communication range and an out-of-communication range of the wireless communication, and the received reflecting body map indicates a distribution of reflecting bodies; and execute, based on the received reflecting body map, the self-position estimation of the vehicle in a case where the communication with the base station fails.

* * * * *